United States Patent [19]

Seiden

[11] Patent Number: 5,288,512
[45] Date of Patent: Feb. 22, 1994

[54] REDUCED CALORIE FATS MADE FROM TRIGLYCERIDES CONTAINING MEDIUM AND LONG CHAIN FATTY ACIDS

[75] Inventor: Paul Seiden, Cincinnati, Ohio

[73] Assignee: The Procter & Gamble Company, Cincinnati, Ohio

[21] Appl. No.: 989,484

[22] Filed: Dec. 4, 1992

Related U.S. Application Data

[63] Continuation of Ser. No. 329,620, Mar. 28, 1989, abandoned, which is a continuation-in-part of Ser. No. 132,400, Dec. 15, 1987, abandoned.

[51] Int. Cl.$^5$ .............................. A23D 5/00
[52] U.S. Cl. ................... 426/607; 426/549; 426/660; 426/804
[58] Field of Search .............. 426/601, 631, 607, 549, 426/606, 565, 603, 804, 660; 260/410.7; 514/546, 547, 557

[56] References Cited

U.S. PATENT DOCUMENTS

| | | |
|---|---|---|
| 2,626,952 | 1/1953 | Lange et al. . |
| 2,815,285 | 12/1957 | Holman et al. . |
| 2,815,286 | 12/1957 | Andre et al. . |
| 2,874,056 | 2/1959 | Drew . |
| 3,006,771 | 10/1961 | Babayan . |
| 3,027,259 | 3/1962 | Baur . |
| 3,210,197 | 10/1965 | Galenkamp . |
| 3,298,837 | 1/1967 | Seiden . |
| 3,353,964 | 11/1967 | Seiden ................... 426/607 |
| 3,450,819 | 7/1969 | Babayan et al. ......... 514/557 |
| 3,494,944 | 2/1970 | Seiden . |
| 3,537,865 | 11/1970 | Daniels et al. . |
| 3,549,387 | 12/1970 | Howard . |
| 3,574,637 | 4/1971 | Andre . |
| 3,592,661 | 7/1971 | Seiden . |
| 3,595,673 | 7/1971 | Seiden . |
| 3,600,186 | 8/1971 | Mattson et al. . |
| 4,005,196 | 1/1977 | Jandacek et al. . |
| 4,034,083 | 7/1977 | Mattson . |
| 4,341,814 | 7/1982 | McCoy . |
| 4,359,482 | 11/1982 | Crosby . |
| 4,479,976 | 10/1984 | Lansbergen et al. ........ 426/607 |
| 4,528,197 | 7/1985 | Blackburn . |
| 4,607,052 | 8/1986 | Mendy et al. .............. 514/547 |
| 4,610,884 | 9/1986 | Lewis et al. . |
| 4,832,975 | 5/1989 | Yang ...................... 426/607 |

(List continued on next page.)

FOREIGN PATENT DOCUMENTS

| | | |
|---|---|---|
| 546643 | 3/1956 | Belgium . |
| 201525 | 4/1987 | European Pat. Off. . |
| 0216419 | 4/1987 | European Pat. Off. . |
| 265699 | of 1988 | European Pat. Off. . |
| 160840 | of 1922 | United Kingdom . |
| 808634 | of 1959 | United Kingdom . |
| 816343 | 7/1959 | United Kingdom . |

OTHER PUBLICATIONS

Jackson et al., "The Polymorphism of 1-Stearyl and 1-Palmityldiacetin, Dibutyrin-Dicaproin and 1-Stearyldipropionin," *J. Chem. Soc.*, vol. 73 (1951), pp. 4827–4829.

Feuge et al., "Dilatometric Properties of Some Butyro- (List continued on next page.)

*Primary Examiner*—Carolyn Paden
*Attorney, Agent, or Firm*—G. W. Allen; E. W. Guttag; R. A. Dabek

[57] ABSTRACT

A reduced calorie fat comprising at least about 15% by weight triglycerides selected from the group consisting of MML, MLM, LLM, and LML triglycerides, and mixtures thereof; wherein M=fatty acids selected from the group consisting of $C_6$ to $C_{10}$ saturated fatty acids, and mixtures thereof, and L=fatty acids selected from the group consisting Of $C_{17}$ to $C_{26}$ saturated fatty acids, and mixtures thereof is disclosed. The fat also has the following fatty acid composition: (a) from about 15% to about 70% $C_6$ to $C_{10}$ saturated fatty acids; (b) from about 10% to about 70% $C_{17}$ to $C_{26}$ saturated fatty acids; (c) not more than about 10% fatty acids selected from the group consisting of $C_{12:0}$ and $C_{14:0}$, and mixtures thereof; (d) not more than about 20% fatty acids selected from the group consisting of $C_{18:1}$, $C_{18:2}$, $C_{18:3}$, and mixtures thereof; and (e) not more than 4% $C_{18:2}$ fatty acids.

21 Claims, No Drawings

U.S. PATENT DOCUMENTS

| | | |
|---|---|---|
| 4,839,192 | 7/1989 | Sagi et al. |
| 4,863,753 | 9/1989 | Hunter et al. ............ 426/633 |
| 4,888,196 | 12/1989 | Ehrman et al. ............ 426/601 |
| 5,023,106 | 6/1989 | Ehrman et al. ............ 426/660 |
| 5,066,510 | 11/1991 | Ehrman et al. ............ 426/607 |

OTHER PUBLICATIONS palmitins, Butyrostearins, and Acetopalmitins", *J. Am. Oil Chem. Soc.*, vol. 33 (1956), pp. 367–371.

Daubert, "Unsaturated Synthetic Glycerides: Unsymmetrical Monoelaidyl-Disaturated and Monosaturated-Dielaidyl Triglycerides," *J. Am. Chem. Soc.*, vol. 66 (1944), pp. 290–292.

Thomas et al., "Enzymatic Interesterification of Canola Oil", Can. Inst. Food Sci. Technol. J. vol. 21 (1988), pp. 167–173.

Hashim et al., "Studies of Man of Partially Absorbed Dietary Fats", Am. J. Clin. Nutr., vol. 31 (1978), pp. S273–S276.

Mok et al., "Structured Medium Chain & Long Chain Triglyceride Emulsions are Superior to Physical Mixtures in Sparing Body Protein in the Burned Rat", Metabolism, vol. 33, No. 10, pp. 910–915, Oct. 1984.

Maiz et al., "Protein Metabolism During Total Parenteral Nutrition (TPN) in Injured Rats Using Medium Chain Triglycerides", Metabolism, vol. 33, No. 10, pp. 901–999, Oct. 1984.

Hamilton et al., Fats and Oils: Chemistry and Technology, pp. 93–96, Applied Science Publishers Ltd., London (1980).

Swern, Bailey's Industrial Oil and Fat Products, 3d ed., pp. 941–943 and 958–965 (1964).

Applewhite, Bailey's Industrial Oil and Fat Products, vol. 3, 4th ed., pp. 1–39, John Wiley & Sons, New York (1985).

Senior, "Medium Chain Triglycerides", pp. 4–5, University of Pennsylvania Press, Philadelphia (1968).

Bach et al., "Medium Chain Triglycerides: an Update", The American Journal of Clinical Nutrition 36, pp. 950–962 (Nov. 1982).

Yamazaki et al., "Hypocaloric Lipid Emulsions and Amino Acid Metabolism in Injured Rats", Journal of Parenteral and Enteral Nutrition, vol. 8, No. 4, pp. 361–366 (1984).

Eckert et al., Pharmaceutical Composition with Enhanced Resorption—Containing Medium-Chain Fatty Acid and Opt. Triglyceride, Feb. 28, 1985 (Abstract).

Cotter et al., Visceral Organ Dysfunction Treatment—by Parenteral Administration of a Mixed Long Chain Triglyceride and Medium Chain Triglyceride Emulsion, Sep. 12, 1985 (Abstract).

Christophe et al., Fatty Acid Chain Length Combinations in Ascitic Fluid Triglycerides Containing Lymphatic Absorbed Medium-Chain Fatty Acids, Oct., 1982 (Abstract).

REDUCED CALORIE FATS MADE FROM TRIGLYCERIDES CONTAINING MEDIUM AND LONG CHAIN FATTY ACIDS

CROSS-REFERENCE TO RELATED APPLICATION

This is a continuation of application Ser. No. 329,620, filed on Mar. 28, 1989, which is a continuation in part of application Ser. No. 132,400, filed on Dec. 15, 1987, both abandoned.

TECHNICAL FIELD

The present invention relates to the field of reduced calorie fats, in particular fats made from triglycerides containing combinations of medium and long chain fatty acids.

BACKGROUND OF THE INVENTION

Typical vegetable oils and animal fats used in foods contain fatty acids which are predominantly 16 or 18 carbons long and contain zero to three double bonds. These are generally referred to as long chain triglycerides. Some oils such as rapeseed oil contain fatty acids having 20 or 22 carbons or higher.

Medium chain triglycerides (MCT's) are triglycerides made with saturated $C_6$ to $C_{10}$ fatty acids. These shorter chain triglycerides are metabolized differently from long chain triglycerides by the body because they are more water-soluble than long chain triglycerides. Because they hydrolyze rapidly and are absorbed via the portal vein, they provide a source of quick energy.

Several references disclose triglycerides containing medium chain and long chain fatty acids. For example, U.S. Pat. No. 3,353,964 of Seiden, issued Nov. 21, 1967, discloses a margarine oil made from corandomized triglycerides containing saturated short chain fatty acids having 6-14 carbon atoms and saturated long chain fatty acids having 20-22 carbon atoms. The triglycerides, a corandomized blend of hydrogenated rapeseed oil with coconut and/or palm kernel oil, are high in lauric acid.

U.S. Pat. No. 4,607,052 of Mendy et al., issued Aug. 19, 1986, discloses triglycerides of the formula:

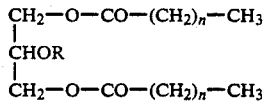

where R represents an acyl fragment of a polyunsaturated fatty acid containing 18 to 22 carbon atoms, the acyl fragment being capable of being oxidized, and where n represents an integer varying from 2 to 16. The triglycerides are used as nutritional supplements to provide a source of polyunsaturated fatty acids.

A synthetic therapeutic oil is disclosed in U.S. Pat. No. 3,450,819 of Babayan et al., issued Jun. 17, 1969. The oil is useful for treating humans suffering from malabsorption of fat. The oil comprises triglycerides having a major portion of medium chain (saturated $C_6$ to $C_{12}$) fatty acids, and a minor portion of essential fatty acids. The essential fatty acids are unsaturated fatty acids, primarily linoleic ($C_{18:2}$), linolenic ($C_{18:3}$), and arachidonic ($C_{20:4}$).

U.S. Pat. No. 4,528,197 of Blackburn, issued Jul. 9, 1985, discloses a composition for enhancing protein anabolism in an hypercatabolic mammal. The composition is made of a nutritionally sufficient source of amino acids, carbohydrates and lipids, the lipids comprising a controlled triglyceride source which, on hydrolysis, yields both long chain fatty acids and medium chain fatty acids. One such fatty acid source disclosed is a structured lipid containing medium chain fatty acids (saturated $C_8$, $C_{10}$, and $C_{12}$), and essential fatty acids.

Mok et al., "Structured Medium Chain and Long Chain Triglyceride Emulsions are Superior to Physical Mixtures in Sparing Body Protein in the Burned Rat", *Metabolism*, Vol . 33, No. 10, pp. 910-915, October 1984, describe an emulsion consisting of triglycerides composed of medium chain and long chain fatty acids in similar proportions used for sparing body protein in burned rats. The triglycerides were made from capric acid ($C_{8:0}$), caprylic acid ($C_{10:0}$), linoleic acid ($C_{18:2}$), and other long chain fatty acids.

Maiz et al., "Protein Metabolism During Total Parenteral Nutrition (TPN) in Injured Rats Using Medium Chain Triglycerides," *Metabolism*, Vol. 33, No. 10, pp. 901-909, October 1984, disclose a lipid emulsion made from triglycerides containing 60% medium chain fatty acids and 40% long chain fatty acids said to improve protein utilization in injured rats. The medium chain fatty acids used are saturated $C_8$ through $C_{12}$, and the long chain fatty acids are derived from sunflower or safflower oil (which consist primarily of mixed triglycerides of linoleic and oleic fatty acid moieties).

European Patent Application 216,419 of Jandacek et al., published Apr. 1, 1987, relates to a nutritional fat suitable for use in enteral and parental products, consisting essentially of from about 50% to about 100% by weight of triglycerides having the formula:

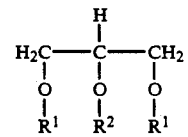

The $R^1$ groups consist of saturated medium chain fatty acids with chain lengths of 7-11 carbon atoms, and the $R^2$ group consists of 0-90% saturated $C_7$-$C_{18}$ fatty acids, 0-90% oleic ($C_{18:1}$), 10-100% linoleic ($C_{18:2}$), and 0-10% linolenic ($C_{18:3}$).

U.S. Pat. No. 2,874,056 of Drew, issued Feb. 17, 1959, discloses a triglyceride composition useful in margarines. The triglyceride is made from a combination of medium chain fatty acids ($C_{8:0}$ through $C_{12:0}$) and palmitic acid ($C_{16:0}$).

The Captex 810 series of oils (Capital City Products, Dept. TR, P.O. Box 569, Columbus, Ohio 43216) contains random structure triglycerides that are made from mixtures of various ratios of long and medium chain fatty acids. The fatty acid compositions of these oils are as follows:

| Fatty acid composition (weight %) of the Captex 810 series | | | |
|---|---|---|---|
| Captex series | Linoleic ($C_{18:2}$) | Octanoic and Decanoic ($C_{8:0}$ & $C_{10:0}$) | Other |
| 810A | 10 | 80 | 10 |
| 810B | 25 | 60 | 15 |
| 810C | 35 | 46 | 19 |
| 810D | 45 | 32 | 23 |

None of these references discloses or suggests the reduced calorie fats of the present invention, or the benefits associated therewith. For example, the Seiden patent discloses a margarine oil high in lauric acid. The object is improved eating quality and heat resistance, not calorie reduction. Additionally, lauric acid is metabolized differently from the medium chain (saturated $C_6$ to $C_{10}$) fatty acids used in the present invention.

Moreover, the references by Mendy et al., Babayan et al., Blackburn, Jandacek et al., etc., relate to fats useful as nutritional supplements. The fats of the present invention, on the other hand, combine a calorie reduction benefit with good taste. The prior references also have fatty acid compositions different from those of the present invention.

It is, therefore, an object of the present invention to provide fat compositions that are reduced in calories when compared to typical chain length triglycerides.

It is another object of the present invention to provide reduced calorie fats that can be used to make food and beverage products having excellent textural and organoleptic properties.

These and other objects of the present invention will become evident from the disclosure herein.

All parts, percentages, and ratios used herein are by weight unless otherwise indicated.

SUMMARY OF THE INVENTION

The invention relates to a reduced calorie fat comprising at least about 15% by weight triglycerides selected from the group consisting of MML, MLM, LLM, and LML triglycerides, and mixtures thereof; wherein M=fatty acids selected from the group consisting of $C_6$ to $C_{10}$ saturated fatty acids, and mixtures thereof, and L=fatty acids selected from the group consisting of $C_{17}$ to $C_{26}$ saturated fatty acids, and mixtures thereof; and wherein the fat has the following fatty acid composition by weight percent:

(a) from about 15% to about 70% $C_6$ to $C_{10}$ saturated fatty acids;
(b) from about 10% to about 70% $C_{17}$ to $C_{26}$ saturated fatty acids;
(c) not more than about 10% fatty acids selected from the group consisting Of $C_{12:0}$ and $C_{14:0}$, and mixtures thereof;
(d) not more than about 20% fatty acids selected from the group consisting of $C_{18:1}$, $C_{18:2}$, $C_{18:3}$, and mixtures thereof; and
(e) not more than 4% $C_{18:2}$ fatty acids.

The reduced calorie fats have excellent organoleptic properties, and can be used in a wide variety of food products (e.g., salted and/or fried snacks, other snacks, desserts, baking mixes and other prepared mixes, processed meat products, frozen entrees, chocolate-type products, ice cream and other frozen desserts, salad dressings, frying and baking shortenings, salad oils, margarines, spreads, prewhipped toppings, peanut butter, frostings, confectionery fillings and other confectioneries, cookies, cakes, pie crusts, pastry crusts, breads and other baked goods, and other baking, cooking or frying products. The fats can also be used as pharmaceutical carriers.

DETAILED DESCRIPTION OF THE INVENTION

Triglyceride fats made with long chain or very long chain saturated fatty acids are reduced in calories because the fatty acids are only poorly absorbed and metabolized by the body. However, the high melting point of these fatty acids gives them a waxy, unpalatable taste. For example, tristearin and tribehenin are low calorie fats, but they are seldom used in foodstuffs because of their waxiness. Therefore, there is a need for a means of making these waxy long chain fats into good-tasting fats that are still reduced in calories.

It has now been surprisingly found that fat compositions containing triglycerides made with a particular combination of saturated long chain fatty acids and saturated medium chain fatty acids provide good taste while still providing a reduction in calories. Thus, the present reduced calorie fats give the advantages of long chain triglycerides without their taste disadvantages.

This finding was unexpected for several reasons. When lauric acid is esterified to a saturated long chain triglyceride, the melting point of the triglyceride is lowered to some extent, but the triglyceride still tastes waxy because it does not melt at body temperature. By contrast, it has now been discovered that when medium chain fatty acids are esterified to such a triglyceride, the melting point of the triglyceride is lowered to a surprisingly much greater extent, so that the triglyceride melts below body temperature and does not taste waxy. This property is highly important for making acceptable foods.

Additionally, it was not clear in view of the prior art that when long chain fatty acids are combined with medium chain fatty acids on a triglyceride molecule, that the combination would provide a calorie reduction benefit. A methodology had to be developed to demonstrate a reduction in absorption.

The present invention is a reduced calorie fat comprising at least about 15% by weight reduced calorie triglycerides selected from the group consisting of MML, MLM, LLM, and LML triglycerides, and mixtures thereof; wherein M=fatty acids selected from the group consisting of $C_6$ to $C_{10}$ saturated fatty acids, and mixtures thereof, and L=fatty acids selected from the group consisting Of $C_{17}$ to $C_{26}$ saturated fatty acids, and mixtures thereof; and wherein the fat has the following fatty acid composition by weight percent:

(a) from about 15% to about 70% $C_6$ to $C_{10}$ saturated fatty acids;
(b) from about 10% to about 70% $C_{17}$ to $C_{26}$ saturated fatty acids;
(c) not more than about 10% fatty acids selected from the group consisting of $C_{12:0}$ and $C_{14:0}$, and mixtures thereof;
(d) not more than about 20% fatty acids selected from the group consisting of $C_{18:1}$, $C_{18:2}$, $C_{18:3}$, and mixtures thereof; and
(e) not more than 4% $C_{18:2}$ fatty acids.

The key to the present reduced calorie fats is their combination of particular long chain fatty acid moieties with medium chain fatty acid moieties. As discussed above, the medium chain fatty acids lower the melting point of the fats, and different fatty acid combinations can be used to control the fats' physical properties for specific food applications. This results in a good-tasting fat having good mouthmelt, texture and flavor display.

Moreover, because they do not taste waxy, the present fats can be used in a wide variety of food products, and at higher concentration in the products to afford a greater calorie reduction. This is in contrast to the more limited use of a more waxy-tasting triglyceride, e.g., a triglyceride containing lauric acid and long chain fatty acids. This nonwaxy taste benefit is particularly evident in chocolate products made with preferred reduced calorie fats of the present invention. As measured by differential scanning calorimetry (DSC), chocolate products containing these preferred fats are completely melted at a temperature of from 94° to 96° F. Most of the melting of these chocolate products also occurs in the fairly narrow temperature range of from 80° to 94° F.

Another advantage of the present fats is that they contain only limited amounts of saturated $C_{12}$ to $C_{16}$ fatty acids. Ingestion of large amounts of these fatty acids is known to promote hypercholesterolemia.

The present fat compositions also provide some of the benefits of medium chain triglycerides. For example, the medium chain fatty acids are readily hydrolyzed from the triglycerides. These hydrolyzed medium chain fatty acids are absorbed and then transported directly to the liver (via the hepatic portal vein) where they are extensively oxidized to provide a rapid energy source.

The reduced calorie fats can be used as a partial or complete replacement for the fat component in food products, permitting an at least about 10% reduction in calories, and preferably an at least about 30% reduction in calories over typical chain length triglycerides (i.e., corn oil), and usually between about 20% and 50% reduction in calories.

For the purposes of the present invention, the reduction in calories provided by the present reduced calorie fats is based on the net energy gain (in Kcal) of rats that have ingested a diet containing the reduced calorie fats, relative to the net energy gain (in Kcal) of rats that have ingested an identical diet, but containing corn oil instead of the reduced calorie fat. The test diets used are nutritionally adequate to support both maintenance and growth of the rats. Total food intake and fat/oil intake are also matched between the two diet groups so that differences in net carcass energy gain are due entirely to the utilizable energy content of the fat/oil. "Net energy gain" is based on the total carcass energy (in Kcal) of the rat fed the test diet for some period of time (usually 4 weeks), reduced by the mean starting carcass energy (in Kcal) determined from a study of a different group of rats of the same sex, strain, and similar body weight fed a test diet that does not contain the fat/oil. "Total carcass energy" is determined by the dry carcass energy per gram (Kcal per gram) multiplied by the dry weight of the carcass (in grams). "Carcass energy per gram" is based on the carcass energy (in Kcal) as determined by bomb calorimetry of a homogeneous sample of the total dry carcass. All of these energy values are the average of a representative sample of rats (i.e., 10 rats).

By "medium chain fatty acids," as used herein, is meant $C_{6:0}$ (caproic), $C_{8:0}$ (caprylic), or $C_{10:0}$ (capric) fatty acids, or mixtures thereof. The $C_7$ and $C_9$ saturated fatty acids are not commonly found, but they are not excluded from the possible medium chain fatty acids. The present medium chain fatty acids do not include lauric acid ($C_{12:0}$), sometimes referred to in the art as a medium chain fatty acid.

By "long chain fatty acids," as used herein, is meant $C_{17:0}$ (margaric), $C_{18:0}$ (stearic), $C_{19:0}$ (nonadecylic), $C_{20:0}$ (arachidic), $C_{21:0}$ (heneicosanoic), $C_{22:0}$ (behenic), $C_{23:0}$ (tricosanoic), $C_{24:0}$ (lignoceric), $C_{25:0}$ (pentacosanoic), or $C_{26:0}$ (cerotic) fatty acids, or mixtures thereof.

In the above listing of fatty acid moieties, the common name of the fatty acid is given following its $C_{x:y}$ designation (wherein x is the number of carbon atoms, and y is the number of double bonds).

By "MML," as used herein, is meant a triglyceride containing a long chain fatty acid in the #1 or #3 position (an end position) with two medium chain fatty acids in the remaining two positions. (The absorption of long chain saturated fatty acids is generally reduced in the end positions.) Similarly, "MLM" represents a triglyceride with a long chain fatty acid in the #2 position (the middle position) and two medium chain fatty acids in the #1 and #3 positions, "LLM" represents a triglyceride with a medium chain fatty acid in the #1 or #3 position and two long chain fatty acids in the remaining two positions, and "LML" represents a triglyceride with a medium chain fatty acid in the #2 position and two long chain fatty acids in the #1 and #3 positions.

By "stearic MCT," as used herein, is meant a mixture of triglycerides according to the present invention that have been prepared by combining predominantly stearic acid ($C_{18:0}$) and medium chain fatty acids in some manner, for example by random rearrangement of tristearin and medium chain triglycerides. The stearic MCT will contain predominantly stearic acid as the long chain fatty acid. By "behenic MCT" is meant a mixture of triglycerides that have been prepared by combining predominantly behenic acid ($C_{22:0}$) and medium chain fatty acids, for example by random rearrangement of tribehenin and medium chain triglycerides. By "stearic/behenic MCT" is meant a mixture of triglycerides that have been prepared by combining predominantly stearic acid, behenic acid, and medium chain fatty acids.

The present reduced calorie fat comprising triglycerides having combinations of medium and long chain fatty acids will preferably contain not more than about 5% by weight $C_{6:0}$ fatty acid, and most preferably not more than about 0.5%. It is also preferred that the fat contain not more than about 7% by weight saturated $C_{24}$ to $C_{26}$ fatty acids, and most preferably not more than about 1%. Preferred reduced calorie fats of the present invention comprise from about 30 to about 55% by weight $C_8$ to $C_{10}$ saturated fatty acids and from about 30 to about 55% by weight $C_{18}$ to $C_{22}$ saturated fatty acids.

Stearic MCT's according to the present invention will preferably have a carbon number profile of at least about 55% $C_{34}$ to $C_{38}$, and contain at least about 40% by weight $C_6$ to $C_{10}$ saturated fatty acids and about 35% to about 50% by weight $C_{18}$ saturated fatty acid.

The reduced calorie fat of the present invention can contain limited amounts of other fatty acids besides medium and long chain fatty acids, without losing the benefits of the invention. As indicated above, small amounts of $C_{12:0}$, $C_{14:0}$, $C_{18:1}$, $C_{18:2}$ and $C_{18:3}$ fatty acids can be present.

Palmitic acid ($C_{16:0}$) is about 95% absorbed by the body, while the longer chain fatty acids are less absorbed. Therefore, it is preferred that the present reduced calorie fat contain not more than about 10% by weight $C_{16:0}$ fatty acid.

In another preferred embodiment, the reduced calorie fat will contain not more than about 6% by weight fatty acids selected from the group consisting of $C_{18:1}$, $C_{18:2}$, $C_{18:3}$, and mixtures thereof, more preferably not more than about 1%, and most preferably not more than about 0.5%. Preferred reduced calorie fats also contain not more than about 3%, and more preferably not more than about 1%, by weight fatty acids selected from the group consisting of $C_{12:0}$ (lauric) and $C_{14:0}$ (myristic), and mixtures thereof. Lauric and myristic acid result in more fat deposition than medium chain fatty acids.

For optimum taste and calorie reduction, it is also preferred that the reduced calorie fats of the present invention comprise at least about 30% by weight of the triglycerides containing combinations of medium and long chain fatty acids (i.e., MML, MLM, LLM and LML triglycerides), more preferably at least about 50% by weight of these triglycerides, and most preferably at least about 80% by weight of these triglycerides. Preferred reduced calorie fats of the present invention comprise at least about 10% by weight of a mixture of MML and MLM triglycerides, more preferably at least about 35% by weight of such combined triglycerides, and most preferably at least about 70% by weight of such combined triglycerides. Preferred reduced calorie fats also comprise not more than about 90% by weight combined LLM and LML triglycerides, more preferably not more than about 65% by weight LLM and LML triglycerides, and most preferably not more than about 30% by weight combined LLM and LML triglycerides. For most uses, these preferred reduced calorie fats also comprise minimized levels of MMM triglycerides and LLL triglycerides. By "MMM," as used herein, is meant a triglyceride containing medium chain saturated fatty acid residues at all three positions. Similarly, "LLL" represents a triglyceride containing long chain saturated fatty acid residues at all three positions. These preferred reduced calorie fats comprise not more than about 15% by weight, more preferably not more than about 10% by weight, and most preferably not more than about 5% by weight MMM triglycerides. These preferred reduced calorie fats also comprise not more than about 5% by weight, more preferably not more than about 2% by weight, and most preferably not more than about 1% by weight LLL triglycerides. However, for ice creams and ice cream coatings, these reduced calorie fats preferably comprise from about 10 to about 15% by weight MMM triglycerides.

Certain reduced calorie fats of the present invention are particularly preferred for chocolate and other confectionery products. These particularly preferred reduced calorie fats comprise at least about 85% by weight of a mixture of MML and MLM triglycerides, more preferably at least about 90% by weight of such combined triglycerides, and most preferably at least about 94% by weight of such combined triglycerides. These preferred reduced calorie fats also comprise no more than about 5% by weight combined LLM and LML triglycerides, more preferably no more than about 2% by weight LLM and LML triglycerides, and most preferably no more than about 1% by weight combined LLM and LML triglycerides. These particularly preferred reduced calorie fats further comprise no more than about 4%, preferably no more than about 2% and most preferably no more than about 1% by weight MMM triglycerides, and no more than about 2% by weight, preferably no more than about 1% by weight and most preferably no more than about 0.5% by weight LLL triglycerides.

These preferred fats for chocolate and other confectionery products also have the following preferred and most preferred carbon number profiles (CNP):

| CNP | PREFERRED (%) | MOST PREFERRED (%) |
|---|---|---|
| 32 or lower | <3 | <1 |
| 34 | <2 | <1 |
| 36 | <4 | <2 |
| 38 | 15-40 | 15-30 |
| 40 | 35-60 | 45-55 |
| 42 | 15-35 | 20-30 |
| 44 | <2 | <1 |
| 46 | <1 | <0.6 |
| 48 | <0.8 | <0.6 |
| 50 | <0.6 | <0.5 |
| 52 | <0.4 | <0.3 |
| 54 or higher | <0.9 | <0.4 |

Table 1 below illustrates some of the possible triglyceride variations within the MML/MLM and LLM/LML groups. Combinations of different medium and long-chain fatty acids on the triglycerides are correlated with the carbon numbers of the triglycerides. (The list is not meant to be exhaustive.) The table shows that a wide variety of triglycerides exist at a given carbon number (CNP).

TABLE 1

Some of the Possible Triglycerides of Medium* and Saturated Long Chain** Fatty Acids

| CNP | MLM & LMM | | | | | |
|---|---|---|---|---|---|---|
| 34 | 8-8-18 | 6-8-20 | 6-6-22 | 8-10-16 | | |
|  | 8-18-8 | 6-20-8 | 6-22-6 | 8-16-10 | | |
|  |  | 8-6-20 |  | 10-8-16 | | |
| 36 | 8-10-18 | 8-8-20 | 6-10-20 | 6-8-22 | 6-6-24 | 10-10-16 |
|  | 8-18-10 | 8-20-8 | 6-20-10 | 6-22-8 | 6-24-6 | 10-16-10 |
|  | 10-8-18 |  | 10-6-20 | 8-6-22 |  |  |
| 38 | 10-10-18 | 8-10-20 | 8-8-22 | 8-6-24 | 6-10-22 | 6-12-20 |
|  | 10-18-10 | 8-20-10 | 8-22-8 | 8-24-6 | 6-22-10 | 12-6-20 |
|  |  | 10-8-20 |  | 6-8-24 | 10-6-22 |  |
| 40 | 8-10-22 | 10-10-20 | 8-8-24 | 6-10-24 | | |
|  | 8-22-10 | 10-20-10 | 8-24-8 | 6-24-10 | | |
|  | 10-8-22 |  |  | 10-6-24 | | |
| 42 | 10-10-22 | 8-10-24 |  |  | | |
|  | 10-22-10 | 8-24-10 |  |  | | |
|  |  | 10-8-24 |  |  | | |
| 44 | 10-10-24 |  |  |  | | |
|  | 10-24-10 |  |  |  | | |

| | LLM & LML | | | |
|---|---|---|---|---|
| 38 | 6-16-16 | | | |
|  | 16-6-16 | | | |
| 40 | 6-16-18 | 8-16-16 | | |
|  | 6-18-16 | 16-8-16 | | |
|  | 16-6-18 | | | |
| 42 | 6-18-18 | 8-16-18 | | |
|  | 18-6-18 | 8-18-16 | | |
|  |  | 16-8-16 | | |
| 44 | 6-18-20 | 6-16-22 | 8-18-18 | |
|  | 6-20-18 | 6-22-16 | 18-8-18 | |
|  | 20-6-18 | 16-6-22 | | |
| 46 | 10-16-20 | 6-18-22 | 8-16-22 | |
|  | 16-20-10 | 18-22-6 | 16-22-8 | |
|  | 16-10-20 | 18-6-22 | 16-8-22 | |
|  | 8-18-20 | 6-16-24 | 6-20-20 | 18-10-18 |
|  | 18-20-8 | 16-24-6 | 20-6-20 | 18-18-10 |
|  | 18-8-20 | 16-6-24 | | |
| 48 | 8-18-22 | 8-16-24 | 10-18-20 | |
|  | 18-22-8 | 16-24-8 | 18-20-10 | |
|  | 18-8-2 | 16-8-24 | 18-10-20 | |
|  | 6-18-24 | 10-16-22 | 6-20-22 | |
|  | 18-24-6 | 16-22-10 | 20-22-6 | |
|  | 18-6-24 | 16-10-22 | 20-6-22 | |
| 50 | 8-20-22 | 18-18-22 | 6-22-22 | |
|  | 20-22-8 | 18-22-10 | 22-6-22 | |
|  | 20-8-22 | 18-10-22 | | |
|  | 10-16-24 | 6-20-24 | 8-18-24 | |
|  | 16-24-10 | 20-24-6 | 18-24-8 | |
|  | 16-10-24 | 20-6-24 | 18-8-24 | |
| 52 | 10-20-22 | 10-18-24 | 8-22-22 | |
|  | 20-22-10 | 18-24-10 | 22-8-22 | |

TABLE 1-continued

Some of the Possible Triglycerides of Medium*
and Saturated Long Chain** Fatty Acids

| | |
|---|---|
| 20-10-22 | 18-10-24 |
| 6-22-24 | 8-20-24 |
| 22-24-6 | 20-24-8 |
| 22-6-24 | 20-10-24 |

*Saturated medium chain fatty acids (M) chain length: 6, 8, 10.
**Saturated long chain fatty acids (L) chain length: 16, 18, 20, 22, 24. (While palmitic acid ($C_{16}$) is included here as a long chain fatty acid for illustration purposes, it is not within the claim definition of a long chain fatty acid.)

Mono-long chain triglycerides according to the present invention are preferred over di-long chain triglycerides in many food applications. Molecular distillation can separate MML/MLM from LLM/LML-type triglycerides, and can shift the composition in carbon number concentration, but it cannot fractionate the triglycerides according to their carbon numbers. Because the composition greatly affects the melting point of triglycerides, fractionation by molecular distillation is an important tool.

Non-solvent or solvent crystal fractionation can also fractionate LMM/MLM-type triglycerides from the higher melting LLM/LML triglycerides. The behenic MCT's fractionate without a solvent at about 70° F. (21° C.), while the stearic or stearic/behenic MCT's fractionate at about 60° F. (16° C.). Crystallization and filtration are usually repeated two or three times.

Uses of Reduced Calorie Fats

The reduced calorie fats of the present invention can be used as a partial or total replacement for normal triglyceride fat in any fat-containing food composition comprising fat and nonfat ingredients to provide reduced calorie benefits. In order to obtain a significant reduction in calories, it is necessary that at least about 50% of the total fat in the food composition, or at least about 20% of the caloric value of the food, comprise the reduced calorie fat. On the other hand, very low calorie and thus highly desirable food compositions of the invention are obtained when the total fat comprises up to 100% of the reduced calorie fat of this invention, and up to about 50% of the calories.

The present reduced calorie fats are useful in a wide variety of food and beverage products. For example, the fats can be used in the production of baked goods in any form, such as mixes, shelf-stable baked goods, and frozen baked goods. Possible applications include, but are not limited to, cakes, brownies, muffins, bar cookies, wafers, biscuits, pastries, pies, pie crusts, and cookies, including sandwich cookies and chocolate chip cookies, particularly the storage-stable dual-textured cookies described in U.S. Pat. No. 4,455,333 of Hong & Brabbs. The baked goods can contain fruit, cream, or other fillings. Other baked good uses include breads and rolls, crackers, pretzels, pancakes, waffles, ice cream cones and cups, yeast-raised baked goods, pizzas and pizza crusts, baked farinaceous snack foods, and other baked salted snacks.

In addition to their uses in baked goods, the reduced calorie fats can be used alone or in combination with other regular calorie fats and oils to make shortening and oil products. Suitable sources of regular fats and oils include, but are not limited to: 1) vegetable fats and oils such as soybean, corn, sunflower, rapeseed, low erucic acid rapeseed, canola, cottonseed, olive, safflower, and sesame seed; 2) meat fats such as tallow or lard; 3) marine oils; 4) nut fats and oils such as coconut, palm, palm kernel, or peanut; 5) milkfat; 6) cocoa butter and cocoa butter substitutes such as shea, or illipe butter; and 7) synthetic fats. Shortening and oil products include, but are not limited to, shortenings, margarines, spreads, butter blends, lards, salad oils, popcorn oils, salad dressings, mayonnaise, and other edible oils.

Certain of the present reduced calorie fats are especially useful in flavored confectionery compositions, particularly chocolate-flavored confectionery compositions. See U.S. application entitled "Process for Tempering Flavored Confectionery Compositions Containing Reduced Calorie Fats and Resulting Tempered Products" to Albert M. Ehrman, Paul Seiden, Rose M. Weitzel and Robert L. White, Ser. No. 329,619, filed Mar. 28, 1989 now U.S. Pat. No. 4,888,196, which is incorporated by reference. These flavored confectionery compositions comprise:

a. a flavor enhancing amount of a flavor component;
b. from about 25 to about 45% of a fat component comprising:
  (1) at least about 70% of a reduced calorie fat having:
    (a) at least about 85% combined MLM and MML triglycerides;
    (b) no more than about 5% combined LLM and LML triglycerides;
    (c) no more than about 2% LLL triglycerides;
    (d) no more than about 4% MMM triglycerides;
    (e) no more than about 7% other triglycerides;
      wherein M is a $C_6$ to $C_{10}$ saturated fatty acid residue and L is a $C_{20}$ to $C_{24}$ saturated acid residue;
    (f) a fatty acid composition having:
      (i) from about 40 to about 60% combined $C_8$ and $C_{10}$ saturated fatty acids,
      (ii) a ratio of $C_8$ to $C_{10}$ saturated fatty acids of from about 1:2.5 to about 2.5:1,
      (iii) from about 40 to about 60% behenic fatty acid,
  (2) up to about 15% milkfat;
  (3) up to about 20% cocoa butter;
  (4) no more than about 4% diglycerides; and
c. from about 55 to about 75% other nonfat confectionery ingredients.

These compositions are preferably tempered according to the process disclosed in said Ehrman et al application which comprises the following steps:

(I) forming a temperable flavored confectionery composition as defined above;
(II) rapidly cooling the composition of step (1) to a temperature of about 57° F. or less so that the reduced calorie fat forms a sub α phase;
(III) holding the cooled composition of step (II) at a temperature of about 57° F. or less for a period of time sufficient to form an effective amount of β-3 crystals from a portion of the sub α phase of the reduced calorie fat; and
(IV) after step (III), warming the cooled composition to a temperature in the range of from above about 57° to about 72° F. in a manner such that: (a) the remaining portion of the reduced calorie fat transforms into a stable β-3 phase; and (b) the β-3 phase formed does not melt.

Certain of the present reduced calorie fats, like cocoa butter, can be crystallized into a stable β-3 phase. However, it has been found that the rate of crystallization of these reduced calorie fats into the β-3 phase is extremely slow under standard tempering conditions used with cocoa butter-based chocolate products. This rate is sufficiently slow so as to make cocoa butter-type tempering of flavored confectionery compositions containing these reduced calorie fats commercially unattractive.

Surprisingly, it has been found that tempering according to said Ehrman et al application provides a commercially attractive process that is simpler than even the standard tempering conditions used with cocoa butter-based chocolate products. In particular, this tempering process can be carried out during the normal warehousing and distribution of the flavored confectionery product. These desirable results are achieved by taking advantage of the ability of these reduced calorie fats to transform into the desired stable $\beta$-3 phase, via the less stable sub $\alpha$ phase. This transformation of the reduced calorie fats from the sub $\alpha$ phase to the stable $\beta$-3 phase according to this tempering process occurs without undesired bloom formation. The resulting tempered products also have the desired firmness and mouthmelt of cocoa butter-based chocolate products.

The present reduced calorie fats can also be fortified with vitamins and minerals, particularly the fat-soluble vitamins. U.S. Pat. No. 4,034,083 of Mattson (incorporated by reference herein) discloses polyol fatty acid polyesters fortified with fat-soluble vitamins. The fat-soluble vitamins include vitamin A, vitamin D, vitamin E, and vitamin K. Vitamin A is a fat-soluble alcohol of the formula $C_{20}H_{29}OH$. Natural vitamin A is usually found esterified with a fatty acid; metabolically active forms of vitamin A also include the corresponding aldehyde and acid. Vitamin D is a fat-soluble vitamin well known for use in the treatment and prevention of rickets and other skeletal disorders. Vitamin D comprises sterols, and there are at least 11 sterols with vitamin D-type activity. Vitamin E (tocopherol) is a third fat-soluble vitamin which can be used in the present invention. Four different tocopherols have been identified (alpha, beta, gamma and delta), all of which are oily, yellow liquids, insoluble in water but soluble in fats and oils. Vitamin K exists in at least three forms, all belonging to the group of chemical compounds known as quinones. The naturally occurring fat-soluble vitamins are $K_1$ (phylloquinone), $K_2$ (menaquinone), and $K_3$ (menadione). The amount of the fat-soluble vitamins employed herein to fortify the present reduced calorie fat materials can vary. If desired, the reduced calorie fats can be fortified with a recommended daily allowance (RDA), or increment or multiple of an RDA, of any of the fat-soluble vitamins or combinations thereof.

Vitamins that are nonsoluble in fat can similarly be included in the present reduced calorie fats. Among these vitamins are the vitamin B complex vitamins, vitamin C, vitamin G, vitamin H, and vitamin P. The minerals include the wide variety of minerals known to be useful in the diet, such as calcium, magnesium, and zinc. Any combination of vitamins and minerals can be used in the present reduced calorie fat.

The present reduced calorie fats are particularly useful in combination with particular classes of food and beverage ingredients. For example, an extra calorie reduction benefit is achieved when the fat is used with noncaloric or reduced calorie sweeteners alone or in combination with bulking agents. Noncaloric or reduced calorie sweeteners include, but are not limited to, aspartame; saccharin; alitame, thaumatin; dihydrochalcones; cyclamates; steviosides; glycyrrhizins, synthetic alkoxy aromatics, such as Dulcin and P-4000; sucrolose; suosan; miraculin; monellin; sorbitol, xylitol; talin; cyclohexylsulfamates; substituted imidazolines; synthetic sulfamic acids such as acesulfame, acesulfam-K and n-substituted sulfamic acids; oximes such as perilartine; rebaudioside-A; peptides such as aspartyl malonates and succanilic acids; dipeptides; amino acid based sweeteners such as gem-diaminoalkanes, meta-aminobenzoic acid, L-aminodicarboxylic acid alkanes, and amides of certain alpha-aminodicarboxylic acids and gem-diamines; and 3-hydroxy-4-alkyloxyphenyl aliphatic carboxylates or heterocyclic aromatic carboxylates.

The reduced calorie fats can be used in combination with other noncaloric or reduced calorie fats, such as branched chain fatty acid triglycerides, triglycerol ethers, polycarboxylic acid esters, sucrose polyethers, neopentyl alcohol esters, silicone oils/siloxanes, and dicarboxylic acid esters. Other partial fat replacements useful in combination with the reduced calorie fats are medium chain triglycerides, highly esterified polyglycerol esters, acetin fats, plant sterol esters,, polyoxyethylene esters, jojoba esters, mono/diglycerides of fatty acids, and mono/diglycerides of short-chain dibasic acids.

Certain of the present reduced calorie fats are particularly useful in reduced calorie fat compositions comprising certain substantially nonabsorbable, substantially nondigestible polyol polyesters. See U.S. application entitled "Reduced Calorie Fat Compositions Containing Polyol Polyesters and Reduced Calorie Triglycerides" to Paul Seiden, Corey J. Kenneally and Thomas J. Wehmeier, Ser. No. 329,629, filed Mar. 28, 1989, now abandoned, which is incorporated by reference. These reduced calorie fat compositions comprise:

a. from about 10 to about 65% of an edible, substantially nonabsorbable, substantially nondigestible polyol fatty acid polyester having at least 4 fatty acid ester groups, wherein the polyol is selected from sugars and sugar alcohols containing from 4 to 8 hydroxy groups and wherein each fatty acid group has from 2 to 24 carbon atoms; and b. from about 35 to about 90% reduced calorie triglycerides selected from MMM, MLM, MML, LLM, LML and LLL triglycerides, and mixtures thereof; wherein M is a saturated fatty acid residue selected from $C_6$ to $C_{10}$ saturated fatty acids, and mixtures thereof; wherein L is a saturated fatty acid residue selected from $C_{18}$ to $C_{24}$ saturated fatty acids, and mixtures thereof; wherein the reduced calorie triglycerides comprise: (1) at least about 85% combined MLM, MML, LLM and LML; and (2) up to about 15% combined MMM and LLL triglycerides, and wherein the fatty acid composition of the reduced calorie triglycerides comprises: (1) from about 10 to about 70% $C_6$ to $C_{10}$ saturated fatty acids; and (2) from about 30 to about 90% $C_{18}$ to $C_{24}$ saturated fatty acids.

Food products can comprise these reduced calorie fat compositions as the sole fat ingredient, or in combination with other fat ingredients such as triglyceride oils. These food products include frying oils for salted snacks and other fried foods, firm chocolate-flavored products such as chocolate-flavored candy bars or chips, as well as cooking and salad oils that are clear at room temperature, i.e., about 70° F. (21.1° C.), and preferably at lower temperatures, e.g., at about 50° F. (10° C.).

Surprisingly, certain of the present reduced calorie fats can function as anti-anal leakage agents for the polyol polyesters. In addition, the combination of the polyol polyesters with these reduced calorie fats provides significant advantages over the use of either component alone. The advantages provided by these combinations include: (1) increased caloric reduction; (2) textural/taste benefits (e.g., less waxiness/greasiness, improved mouthmelt); (3) less color degradation during frying; and (4) less high temperature volatility and foaming during frying.

Bulking or bodying agents are useful in combination with the reduced calorie fats in many food compositions. The bulking agents can be nondigestible carbohydrates, for example, polydextrose and cellulose or cellulose derivatives, such as carboxymethylcellulose, carboxyethylcellulose, hydroxypropylcellulose, methylcellulose and microcrystalline cellulose. Other suitable bulking agents include gums (hydrocolloids), starches, dextrins, fermented whey, tofu, maltodextrins, polyols, including sugar alcohols, e.g. sorbitol and mannitol, and carbohydrates, e.g. lactose.

Similarly, food and beverage compositions can be made that combine the present reduced calorie fats with dietary fibers to achieve the combined benefits of each. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and man-made fibers (for example, by bacterial synthesis). Commercial fibers such as purified plant cellulose, or cellulose flour, can also be used. Naturally occurring fibers include fiber from whole citrus peel, citrus albedo, sugar beets, citrus pulp and vesicle solids, apples, apricots, and watermelon rinds.

These dietary fibers may be in a crude or purified form. The dietary fiber used may be of a single type (e.g. cellulose), a composite dietary fiber (e.g. citrus albedo fiber containing cellulose and pectin), or some combination of fibers (e.g. cellulose and a gum). The fibers can be processed by methods known to the art.

The reduced calorie fats can also contain minor amounts of optional flavorings, emulsifiers, anti-spattering agents, anti-sticking agents, anti-oxidants, or the like.

Of course, judgment should be exercised to make use of appropriate reduced calorie fats and combinations of these fats with other food ingredients. For example, a combination of sweetener and fat would not be used where the specific benefits of the two are not desired. The fat and fat ingredient combinations are used where appropriate, and in the proper amounts.

Many benefits are obtained from the use of the present reduced calorie fats in food and beverage compositions, either when used alone or in combination with the ingredients discussed above. A primary benefit is the calorie reduction achieved when the fat is used as a total or partial fat replacement. This calorie reduction can be increased by using combinations of the present fats with reduced calorie sweeteners, bulking agents, or other reduced calorie or noncaloric fats. Another benefit which follows from this use is a decrease in the total amount of fats in the diet. Foods or beverages made with the reduced calorie fats instead of triglyceride fats will also contain less cholesterol, and the ingestion of these foods can lead to reduced serum cholesterol and thus reduced risk of heart disease.

A related benefit is that the use of the reduced calorie fats allows the production of foods and beverages that are stable in terms of shelf stability and penetration stability. Compositions made with the reduced calorie fats have acceptable organoleptic properties, particularly taste and texture.

Dietary foods can be made with the reduced calorie fats to meet special dietary needs, for example, of persons who are obese, diabetic, or hypercholesterolemic. The reduced calorie fat can be a major part of a low-fat, low-calorie, low-cholesterol diet, and they can be used alone or in combination with drug therapy or other therapy. Combinations of food or beverage products made with the reduced calorie fat can be used as part of a total dietary management regimen, based on one or more of these products, containing the reduced calorie fat alone or in combination with one or more of the above-mentioned ingredients, to provide one or more of the above-mentioned benefits.

This discussion of the reduced calorie fats uses, combinations, and benefits, is not intended to be limiting or all-inclusive. It is contemplated that other similar uses and benefits can be found that will fall within the spirit and scope of this invention.

Method of Preparation

The triglycerides used in the reduced calorie fats of the present invention can be prepared by a wide variety of techniques such as:

(a) random rearrangement of long chain triglycerides (e.g. tristearin or tribehenin) and medium chain triglycerides;

(b) esterification of glycerol with a blend of the corresponding fatty acids;

(c) transesterification of a blend of medium and long chain fatty acid methyl esters with glycerol; and (d) transesterification of long chain fatty acid glycerol esters (e.g., glyceryl behenate) with medium chain triglycerides.

Random rearrangement of triglycerides is well-known in the art, as is the esterification of glycerol with fatty acids. For discussions on these subjects, see Hamilton et al., *Fats and Oils: Chemistry and Technology*, pp. 93-96, Applied Science Publishers Ltd., London (1980), and Swern, *Bailey's Industrial Oil and Fat Products*, 3d ed., pp. 941-943 and 958-965 (1964), both disclosures incorporated by reference herein. Transesterification is also discussed generally in Bailey's at pp. 958-963.

Fatty acids per se or naturally occurring fats and oils can serve as sources of fatty acids for preparing the reduced calorie triglycerides. For example, hydrogenated soybean oil and hydrogenated high erucic acid rapeseed oil are good sources of stearic and behenic acid, respectively. Odd chain length long chain saturated fatty acids can be found in ceratin marine oils. Medium chain saturated fatty acids can be obtained from coconut, palm kernel, or babassu oils. They can also be obtained from commercial medium chain triglycerides, such as the Captex 300 brand sold by Capital City Products of Columbus, Ohio.

Tribehenin, useful for making the present triglycerides, can be made from behenic acid or from fractionated methyl behenate by esterification of the acid, or by transesterification of the methyl behenate with glycerol. More importantly, blends of behenic acid and medium chain fatty acids can be esterified with glycerol. Other long chain fatty acids ($C_{18}$, $C_{20}$, etc.) can be part of the process. Similarly, methyl ester blends can also be interesterified with glycerol.

The present reduced calorie fats are generally made by blending the above-described triglycerides with additional fat or oil ingredients. However, the invention is not limited by the method of preparation; other methods known to the art for making fats or oils can also be used. The fats can be refined, bleached, deodorized, or processed in other ways not inconsistent with the purposes of the invention.

The reduced calorie fats can be modified to satisfy specific product performance requirements by additional fractionation. Solvent and non-solvent crystal fractionation or fractional distillation methods (e.g. molecular distillation as described above) can be applied to optimize performance. Standard fractionation methods are discussed in Applewhite, *Bailey's Industrial Oil and Fat Products*, Vol. 3, 4th ed. (1985), pp. 1-39, John Wiley & Sons, New York, incorporated by reference herein.

Fractional distillation of the present reduced calorie fats is not limited to molecular distillation, but can also include conventional distillation (continuous or batch). After synthesis of the fats, it is common to use a conventional batch distillation technique to remove most of the excess medium chain triglycerides, and then continue with molecular distillation. The vacuum requirements are not as strict, and the temperature used can be higher in conventional distillation versus molecular distillation. The conventional distillation temperature is generally between 405° F. (207° C.) and 515° F. (268.3° C.). The absolute pressure is less than 8 mm Hg, more preferably less than 2 mm Hg. The distillation is aided by sparging with steam, nitrogen or other inert gas (e.g., $CO_2$). The distillation is carried out to remove part of the excess MCT, most of the excess MCT, or to distill also the mono-long chain (MLM and LMM) components.

Crystal fractionation of the fats can be carried out with and without solvents, with and without agitation. The crystal fractionation can be repeated several times. Crystal fractionation is particularly effective to remove high melters. Fractionation of behenic MCT without solvents can be used to remove carbon number 50 and 52 LLM and LML components, which in turn alters the melting profile of the fat.

Analytical Methods

A. Carbon Number Profile (CNP)

1. CNP/HPLC Method

The carbon number profile of the triglycerides comprising the reduced calorie fats of the present invention can be measured by high performance liquid chromatography (HPLC). The method also measures the percentages of medium chain triglycerides, mono-long chain and di-long chain triglycerides. A triglyceride sample to be analyzed is injected on a reverse phase liquid chromatograph (LC) equipped with a mass (evaporative light scattering) detector. A linear gradient of increasing methylene chloride in acetonitrile is used to separate all of the triglycerides based on fatty acid chain length. Retention time increases with increasing fatty acid chain length. Thus, medium chain triglycerides are eluted first, followed by mono-long chain and then di-long chain triglycerides.

| Apparatus | |
|---|---|
| Dispensers | 1 mL, American Scientific #P4952-1, or equivalent, American Scientific Products, 1430 Waukegan Rd., McGaw Park, IL 60085 |
| Pasteur pipets, glass | Fisher #13-678-7A, or equivalent, Fisher Scientific Co., 203 Fisher Bldg., Pittsburgh, PA 15219 |
| Vials, glass | 2 dram with foil-lined cap |
| Autosampler vials | 2 mL, Fisher #03-340-SG, Fisher Scientific Co. |
| Vial caps | PTFE Rubber, Fisher #03-340-13C, Fisher Scientific Co. |
| LC columns | 2 Beckman Ultrasphere ODS, 5 um, 0.46 cm i.d. × 25 cm, Beckman Instruments, Inc., 2500-T Harbor Blvd., Fullerton, CA 92634 |
| LC system | Hewlett-Packard 1090L with Ternary DR5 pump, variable volume injector, autosampler, heated column compartment and column switching valve, Hewlett-Packard Co., Scientific Instruments Div., 1601-T California Ave., Palo Alto, CA 94304 |
| Mass detector | Applied Chromatography Systems #750/14, Varex Corp., 12221 Parklane Dr., Rockville, MD 20852 |
| Recorder | Kipp & Zonen #BD40, or equivalent, Kipp & Zonen, Div. of Enraf-Nonius, 390-T Central Ave., Bohemia, NY 11716 |
| Laboratory Automation System (LAS) | Hewlett-Packard 3357, or equivalent, Hewlett-Packard Co., Scientific Instruments Div. |
| Filters | Gelman #4451, 0.2 um, or equivalent, Gelman Instrument Co., 605-T S. Wagner Rd., Ann Arbor, MI 48106 |
| Solvent Clarification kit | Waters #85124, Waters Instruments, Inc., 2411-T 7th St. N.W., Rochester, MN 55901 |
| Syringe | 5 ml, disposable, Fisher #14-823-200, or equivalent, Fisher Scientific Co. |
| Reagents | |
| Methylene chloride | Burdick and Jackson, UV Grade, American Scientific #300-4L, American Scientific Products |
| Acetonitrile | Burdick and Jackson, UV Grade, American Scientific #015-4L, American Scientific Products |

Sample Preparation

1. Weigh 0.1 g of the melted sample into a 2 dram vial.
2. Dispense 1 mL of methylene chloride into vial and mix thoroughly.
3. Filter the sample solution through a 0.2 um filter into an autosampler vial.

LAS Method and Sequence Preparation

1. Set up the integration method, referring to the HP-3357 Quick Reference Guide for instructions. The calibration table is shown in Table 2.
2. Set up a LAS sample sequence for the appropriate number of samples. Refer to the Reference guide as necessary.

TABLE 2

Calibration Table

| | Time | Factor | Amount | Peak Name |
|---|---|---|---|---|
| 1. | 3.48 | 1.000000 | 1.000000 | C22 |
| 2. | 3.80 | 1.000000 | 1.000000 | C24 |
| 3. | 4.18 | 1.000000 | 1.000000 | C26 |
| 4. | 4.30 | 1.000000 | 1.000000 | C28 |
| 5. | 4.65 | 1.000000 | 1.000000 | C30 |
| 6. | 5.32 | 1.000000 | 1.000000 | C32 |
| 7. | 6.01 | 1.000000 | 1.000000 | C34 |
| 8. | 6.80 | 1.000000 | 1.000000 | C36 |
| 9. | 7.87 | 1.000000 | 1.000000 | C38 |
| 10. | 8.98 | 1.000000 | 1.000000 | C40 |
| 11. | 10.31 | 1.000000 | 1.000000 | C42 |
| 12. | 11.88 | 1.000000 | 1.000000 | C44 |
| 13. | 13.49 | 1.000000 | 1.000000 | C46 |
| 14. | 15.35 | 1.000000 | 1.000000 | C48 |
| 15. | 17.28 | 1.000000 | 1.000000 | C50 |
| 16. | 19.49 | 1.000000 | 1.000000 | C52 |
| 17. | 21.60 | 1.000000 | 1.000000 | C54 |
| 18. | 23.87 | 1.000000 | 1.000000 | C56 |
| 19. | 26.18 | 1.000000 | 1.000000 | C58 |
| 20. | 28.50 | 1.000000 | 1.000000 | C60 |
| 21. | 30.77 | 1.000000 | 1.000000 | C62 |
| 22. | 33.03 | 1.000000 | 1.000000 | C64 |
| 23. | 35.24 | 1.000000 | 1.000000 | C66 |

LC Operation

A. Start-up
1. Turn on power for the HP1090.
2. Filter all solvents with filtration apparatus.
3. Fill reservoirs with filtered solvent; reservoir A contains acetonitrile and reservoir B contains methylene chloride. Open helium toggle valve on back of LC and degas solvents for at least 5-10 minutes. Close helium toggle valve.
4. Set the mass detector to the following settings:
   Attenutation: 2
   Photomultiplier: 2
   Time Constant: 5
   Evaporator Setting: 50
   Nitrogen: 12 psi
5. Set up the mobile phase gradient method in Table 3 on the HP1090 as necessary. Refer to HP1090 Operator's Handbook for programming directions. Once the method is programmed, it will remain in the memory until it is erased, even with power off or instrument unplugged.

TABLE 3

Mobile Phase Gradient Program

METHOD 1
TMCT
SDS CONFIG A = 1 B = 1 C = 0
FLOW = 2
% B = 35 C = 0
OVEN = 40 INJ VOL = 10 SLOWDOWN = 5
MAX PRESS = 300
MIN PRESS = 0
STOP TIME = 40.1
POST TIME = 5
COLUMN SWITCH = 0
E = 0 0 0 0
AT 0 E4 = 1
AT 0 % B = 35 % C = 0
AT .1 E4 = 0
AT 40 % B = 55 % C = 0

B. Autosampler Operation
1. Place the filled autosampler vials in autosampler holders starting with space "0". Autosampler starts numbering with "0" and the LAS starts numbering with "1", thus the sequence numbers are shifted by one.
2. Program and start the autosampler for number of injections, refer to handbook.

Reference Standards

A reference standard is used to insure proper LC/detector operation and to verify the identification of the triglyceride peaks. Typically, a well-characterized material is used. When such material is not available, a commercial material such as Nu Chek Prep 50A and 51A can be substituted (Nu Chek Prep, Inc., P.O. Box 172, Elysian, Minn. 56028). The reference standard is analyzed each day prior to sample analyses.

Results

1. As each sample is analyzed, the LAS will generate a report according to the instructions of the integration method (Table 2). The report lists peak number, retention time, and area percent for a given carbon number of the triglyceride sample.
2. Since retention times of peaks will shift as a function of column usage, verify the proper identification of the reference standards peaks. If peaks are mislabelled, modify the retention time table of the integration method and reanalyze the sequence to generate the new reports.
3. A chromatogram is often helpful to understand the data. Use CPLOT to generate a chromatogram.

2. CNP/GC Method

The carbon number profile (CNP) of the triglycerides comprising the reduced calorie fat of the present invention can also be determined by programmed temperature-gas chromatography (GC) using a short fused silica column coated with methyl silicone for analysis and characterization of the composition by molecular weight. The glycerides are separated according to their respective carbon numbers, wherein the carbon number defines the total number of carbon atoms on the combined fatty acid residues. The carbon atoms on the glycerol molecule are not counted. Glycerides with the same carbon number will elute as the same peak. For example, a triglyceride composed of three $C_{16}$ (palmitic) fatty acid residues will co-elute with triglycerides made up of one $C_{14}$ (myristic), one $C_{16}$ and one $C_{18}$ (stearic) fatty acid residue or with a triglyceride composed of two $C_{14}$ fatty acid residues and one $C_{20}$ (arachidic) fatty acid residue.

Preparation of the fat sample for analysis is as follows: 1.0 ml. of a tricaprin internal standard solution (2 microg./ml.) is pipetted into a vial. The methylene chloride solvent in the standard solution is evaporated using a steam bath under a nitrogen stream. Two drops of the fat sample (20 to 40 microg.) are pipetted into a vial. If the fat sample is solid, it is melted on a steam bath and stirred well to insure a representative sample. 1.0 ml. of bis (trimethylsilytrifluoroacetamide) (BSTFA) is pipetted into the vial which is then capped. The contents of the vial are shaken vigorously and then placed in a beating block (temperature of 100° C.) for about 5 minutes.

For determining the CNP-GC of the prepared fat samples, a Hewlett-Packard 5880A series gas chromatograph equipped with temperature programming and a hydrogen flame ionization detector is used together with a Hewlett-Packard 3351B data system. A 2 m. long, 0.22 mm. diameter fused silica capillary column coated with a thin layer of methyl silicone (Chrompak CP-SIL 5) is also used. The column is heated in an oven where temperature can be controlled and increased according to a specified pattern by the temperature programmer. The hydrogen flame ionization detector is attached to the outlet port of the column. The signal generated by the detector is amplified by an electrometer into a working input signal for the data system and recorder. The recorder prints out the gas chromatograph curve and the data system electronically integrates the area under the curve. The following instrument conditions are used with the gas chromatograph:

| | |
|---|---|
| Septum purge | 1 ml./min. |
| Inlet pressure | 5 lbs./in.$^2$ |
| Vent flow | 75 ml./min. |
| Makeup carrier | 30 ml./min. |
| Hydrogen | 30 ml./min |
| Air | 400 ml./min. |

1.0 microl. of the prepared fat sample is taken by a gas-tight syringe and injected into the sample port of the gas chromatograph. The components in the sample port are warmed up to a temperature of 365° C. and swept by a helium carrier gas to push the components into the column. The column temperature is initially set at 175° C. and held at this temperature for 0.5 min. The column is then heated up to a final temperature of 355° C. at a rate of 25° C./min. The column is maintained at the final temperature of 355° C. for an additional 2 min.

The chromatographic peaks generated are then identified and the peak areas measured. Peak identification is accomplished by comparison to known pure glycerides previously programmed into the data system. The peak area as determined by the data system is used to calculate the percentage of glycerides having a particular Carbon Number ($C_N$) according to the following equation:

$$\% \ C_N = (Area \ of \ C_N/S) \times 100$$

wherein S = sum of Area of $C_N$ for all peaks generated.

The Area of $C_N$ is based upon the actual response generated by the chromatograph multiplied by a response factor for glycerides of the particular Carbon Number. These response factors are determined by comparing the actual responses of a mixture of pure glycerides of various Carbon Numbers to the known amounts of each glyceride in the mixture. A glyceride generating an actual response greater than its actual amount has a response factor less than 1.0; likewise, a glyceride generating a response less than that of its actual amount has a response factor of greater than 1.0. The mixture of glycerides used (in a methylene chloride solution) is as follows:

| Component | Carbon No. | Amount (mg./ml.) |
|---|---|---|
| Palmitic acid | 16 | 0.5 |
| Monopalmitin | 16 | 0.5 |
| Monostearin | 18 | 0.5 |
| Dipalmitin | 32 | 0.5 |
| Palmitostearin | 34 | 0.5 |
| Distearin | 36 | 0.5 |
| Tripalmitin | 48 | 1.5 |
| Dipalmitostearin | 50 | 1.5 |
| Distearopalmitin | 52 | 1.5 |
| Tristearin | 54 | 1.5 |

B. Fatty Acid Composition

Principle

The fatty acid composition of the triglycerides comprising the reduced calorie fat of the present invention is measured by gas chromatography. First, fatty acid ethyl esters of the triglycerides are prepared by any standard method (e.g., by transesterification using sodium ethoxide), and then separated on a capillary column which is coated with DB-WAX stationary phase. The fatty acid ethyl esters are separated by chain length and degree of unsaturation. A split injection is made with flame ionization detection. Quantitation is performed by use of a double internal standard method. This method can separate fatty acid ethyl esters from C6 to C24.

| Equipment | |
|---|---|
| Gas Chromatograph | Hewlett-Packard 5890, or equivalent, equipped with a split injector and flame ionization detector, Hewlett-Packard Co., Scientific Instruments Div., 1601-T California Ave., Palo Alto, CA 94304 |
| Autosampler Injector column | Hewlett-Packard 7673A, or equivalent |
| Column | 15 m × 0.25 mm I.D., fused silica capillary column coated with DB-WAX (0.25 micron film thickness), Hewlett-Packard Co., Scientific Instruments Div. |
| Data System | Hewlett-Packard 3350, 3000-T Hanover St., Palo Alto, CA 94304 |
| Recorder | Kipp & Zonen, BD40, Kipp & Zonen |
| Reagent | |
| Hexane | Burdick & Jackson, or equivalent, American Scientific Products |

Reference Standards

Two reference standards are used each day of operation to verify proper operation of this method. 1) A reference mixture of fatty acid methyl esters (FAME) is used to check the operation of the instrument. This reference mixture has the following fatty acid composition: 1% $C_{14:0}$, 4% $C_{16:0}$, 3% $C_{18:0}$, 45% $C_{18:1}$, 15% $C_{18:2}$, 3% $C_{18:3}$, 3% $C_{20:0}$, 3% $C_{22:0}$, 20% $C_{22:1}$, and 3% $C_{24:0}$. 2) A reference standard of a commercial shortening is used to check the operaton of the total system—ethylation and gas chromatographic analysis. The shortening reference standard has the following fatty acid composition: 0.5% $C_{14:0}$, 21.4% $C_{16:0}$, 9.2% $C_{18:0}$, 40.3% $C_{18:1}$, 23.0% $C_{18:2}$, 2.2% $C_{18:3}$, 0.4% $C_{10:0}$, 1.3% $C_{20:1}$, and 0.3% $C_{22:0}$.

The reference mixture of FAME should be diluted with hexane and then injected into the instrument. A new vial of FAME reference mixture should be opened every day since the highly unsaturated components, $C_{18:2}$ and $C_{18:3}$, oxidize easily. The shortening reference standard should be ethylated with the samples prior to their analysis by capillary gas chromatography. The results from the reference standards should be compared with the known values and a judgment made concerning the completed analysis. If the results of the reference standards are equal to or within ± standard deviations of the known values, then the equipment, reagents and operations are performing satusfactorily.

Operation

A. Instrumental Set-up

1. Install the column in the gas chromatograph, and set up the instrumental conditions as in Table 4.
2. Set up the data system with the appropriate method to acquire and analyze the data. The retention times may have to be adjusted in the method due to instrument variations. Consult the data system reference manual on how to do this—HP3350 User's Reference Manual. Unity response factors are used for each component.
3. Obtain the shortening reference standard for analysis with the samples and ethylate it with the samples.

TABLE 4

| INSTRUMENTAL CONDITIONS | |
|---|---|
| Instrument | Hewlett-Packard 5890 |
| Column | 15 m × 0.25 mm I.D., coated with DB-WAX, 0.25 u film thickness |
| Column head pressure | 12.5 psi |
| Carrier gas | Helium |
| Injector "A" temperature | 210° C. (410° F.) |
| Split vent flow | 100 mL/min |
| Septum purge | 1.5 mL/min |
| Oven temperature profile: | |
| Initial temperature | 110° C. (230° F.) |
| Initial time | 1 min |
| Rate 1 | 15° C./min |
| Final temp 1 | 170° C. (338° F.) |
| Final time 1 | 0 min |
| Rate 2 | 6° C./min |
| Final temp 2 | 200° C. (392° F.) |
| Final time 2 | 0 min |
| Rate 3 | 10° C./min |
| Final temp 3 | 220° C. (428° F.) |
| Final time 3 | 8 min |
| Detector | FID |
| Detector temp | 230° C. (446° F.) |
| Make-up gas | 30 mL/min |
| Detector H$_2$ flow | 30 mL/min |
| Detector air flow | 300 mL/min |

B. Analysis of Samples—(The samples are analyzed with a double internal standard.)

1. Dilute the reference mixture of FAME with hexane. The methyl esters should be approximately 2% in hexane. Inject one microliter of this solution via the autosampler. The results must meet the criteria in the Reference Standards section.
2. Prepare the triglyceride samples to be analyzed by adding two different internal standards, C$_9$ and C$_{21}$ triglycerides. (C$_9$ and C$_{21}$ triglycerides are commercial standards consisting of 100% 9-carbon and 21-carbon triglycerides, respectively.) The internal standards are added to the samples at about 10% by weight of the sample. The samples (including the internal standards) are then converted to ethyl esters by any standard method.
3. Set up a sequence in the LAS data system to inject the samples.
4. Activate the autosampler to inject 1.0 microl. of the samples in the sequence. The gas chromatograph will automatically begin its temperature program and the data system will collect and analyze the data for the sequence.
5. The data is analyzed with the two internal standard procedure. The absolute amount (mg of esters per gram of sample) of the C$_6$ through C$_{16}$ components is calculated from the C$_9$ internal standard. The absolute amount of the C$_{18}$, C$_{20}$, C$_{22}$ and C$_{24}$ components is calculated from the C$_{21}$ internal standard. Weight percentages of fatty acids are calculated from these amounts.

The following examples are intended only to further illustrate the invention and are not intended to limit the scope of the invention which is defined by the claims.

EXAMPLE 1

A reduced calorie fat according to the present invention is made by random rearrangement of tribehenin and commercial grade medium chain triglycerides.

The tribehenin is first synthesized by reacting glycerol with a blend of methyl esters having the following fatty acid composition by weight: 7.5% C$_{18:0}$, 7.4% C$_{20:0}$, 82.4% C$_{22:0}$, and 2.7% C$_{24:0}$. 88.6 lbs. of the methyl ester blend is reacted for 6 hours with 7.2 lbs. of glycerol along with 142 g. of sodium methoxide catalyst in a stainless steel reactor, under a vacuum of 10 mm Hg absolute pressure, and using mechanical agitation, refluxing and nitrogen sparging. During the reaction the temperature gradually rises from 120° C. (248° F.) to 160° C. (320° F.). At the end of 6 hours the reaction mixture is cooled to 120° C. (248° F.) and the catalyst is neutralized with 181 g. of 75% phosphoric acid. The reaction mixture is filtered to remove the sodium phosphate formed. To remove the residual methyl esters, 72 lbs. of the filtered fat is stripped for 4 hours at 240° C. (464° F.) to 280° C. (536° F.) using nitrogen sparging, mechanical agitation and a vacuum of 8-20 mm Hg. absolute pressure, and then stripped for 1 hour using water sparging under the same conditions. The carbon number profile (by HPLC) of the product tribehenin is: 1.3% C$_{58}$, 2.9% C$_{60}$, 19.2% C$_{62}$, 18.4% C$_{64}$, 48.9% C$_{66}$, 4.4% C$_{68}$ and 4.9% others.

24.8 lbs. of the tribehenin undergoes random rearrangement by reaction with 57.9 lbs. of commercial grade medium chain triglycerides in a stainless steel vessel with agitation, using 0.2% sodium methoxide as the catalyst. The medium chain triglycerides contain approximately 68% caprylic acid, 30.5% capric acid, less than 1% caproic acid, and 0.5% lauric acid. The reaction takes place under the following conditions:

| Time | Temperature | Reaction |
|---|---|---|
| 0 | 190° F. (88° C.) | The reactants are added to the vessel along with 30 g. of the catalyst. |
| 20 min. | 196° F. (91° C.) | 43 more grams of catalyst are added. |
| 40 min. | 172° F. (78° C.) | 15 more grams of catalyst are added. |
| 55 min. | 172° F. (78° C.) | The catalyst is neutralized by adding 118 g. of 75% phosphoric acid. |
| 1 hr., 23 min. | 172° F. (78° C.) | About 1.4 lbs. of activated carbon and about 1.4 lbs. of bleaching earth are added to the reaction mixture. |
| 2 hr., 58 min. | 172° F. (78° C.) | The reaction mixture is filtered through a plate and frame filter using about 400 g. of filter aid (i.e. Kiesel Guhr) |

Seventy-four lbs. of product filtrate is obtained. The carbon number profile of the product as measured by HPLC is shown in Table 5 below as Behenic MCT, Batch 1.

TABLE 5

Carbon Number Profile and Fatty Acid Composition

Stearic-Behenic MCT:

| CNP | Batch 1 | Batch 2 | Batch 3 | Batch 4 |
|---|---|---|---|---|
| 24 | 2.4% | | | |
| 26 | 9.8 | | | |
| 30 | 6.1 | | | |
| 32 | 9.4 | 1.2% | | 2.0% |
| 34 | 25.8 | 17.2 | 3.9% | 19.6 |
| 36 | 21.8 | 27.3 | 16.9 | 26.9 |
| 38 | 16.3 | 33.9 | 39.0 | 30.6 |
| 40 | 5.5 | 16.6 | 27.9 | 16.4 |
| 42 | 0.6 | 2.9 | 6.7 | 2.5 |
| 44 | | 1.0 | 3.0 | 0.8 |
| 46 | | | 1.4 | |

| FAC | Batch 1 | Batch 3 | Batch 4 |
|---|---|---|---|
| $C_8$ | 34.6% | 29.8% | 29.1% |
| $C_{10}$ | 22.0 | 16.2 | 13.4 |
| $C_{12}$ | 0.4 | 0.1 | 0 |
| $C_{14}$ | 0 | 0 | 0 |
| $C_{16}$ | 2.9 | 1.1 | 1.4 |
| $C_{18}$ | 24.6 | 14.9 | 18.7 |
| $C_{18:1}$ | 0.2 | 0 | 0 |
| $C_{18:2}$ | 0 | 0 | 0 |
| $C_{18:3}$ | 0 | 0 | 0 |
| $C_{20}$ | 3.1 | 5.7 | 5.1 |
| $C_{22}$ | 10.2 | 28.5 | 19.5 |
| $C_{24}$ | 0.2 | 0.5 | 0.3 |

*By "0%", as used herein, is meant that none was detected by the available analytical method.

Behenic MCT:

| CNP* | Batch 1 | Batch 2 | Batch 3 | Batch 4 | Batch 5 | Batch 6** |
|---|---|---|---|---|---|---|
| 22 | 12.9 | | | | | |
| 24 | 17.9 | 0.4 | | | 1.6 | |
| 26 | 8.6 | 3.6 | | | 4.4 | |
| 28 | | 5.9 | | | | |
| 30 | 1.6 | 4.1 | | 0.7 | 2.7 | |
| 32 | 2.1 | 1.1 | | 0.5 | 1.5 | 0.1 |
| 34 | 2.5 | 4.6 | 0.8 | 1.5 | 2.5 | 0.3 |
| 36 | 4.6 | 13.6 | 9.4 | 9.9 | 9.5 | 2.5 |
| 38 | 20.6 | 35.3 | 37.7 | 39.5 | 35.5 | 29.0 |
| 40 | 15.2 | 27.4 | 39.9 | 37.1 | 33.7 | 47.2 |
| 42 | 3.1 | 6.1 | 13.8 | 10.8 | 8.7 | 17.6 |
| 44 | 0.4 | | 0.5 | | | 0.9 |
| 48 | 0.9 | | | | | 0.3 |
| 50 | 1.1 | | | | | 0.4 |
| 52 | 5.0 | | | | | 0.4 |
| 54 | 1.6 | | | | | 0.1 |

*Batches 1-5 by HPLC, Batch 6 by GC
**Subjected to multiple path molecular distillation, followed by nonsolvent crystal fractionation at 76° F. (24.4° C.)

| FAC | Batch 5 | Batch 6 |
|---|---|---|
| $C_6$ | 0.9 | 0.2 |
| $C_8$ | 28.5 | 22.9 |
| $C_{10}$ | 19.3 | 23.8 |
| $C_{12}$ | 0.3 | 0.4 |
| $C_{14}$ | 0 | 0 |
| $C_{16}$ | 0.3 | 0.1 |
| $C_{18}$ | 0.7 | 0.8 |
| $C_{18:1}$ | 0 | 0.1 |
| $C_{18:2}$ | 0 | 0 |
| $C_{18:3}$ | 0 | 0 |
| $C_{20}$ | 2.6 | 3.4 |
| $C_{22}$ | 44.0 | 43.4 |
| $C_{24}$ | 0.5 | 1.0 |

Stearic MCT:

| CNP | Batch 1 | Batch 2 |
|---|---|---|
| 24 | | 3.3 |
| 26 | 5.1 | 8.5 |
| 28 | | 2.1 |
| 30 | 3.0 | 2.2 |
| 32 | 10.9 | 11.3 |
| 34 | 38.9 | 36.2 |
| 36 | 31.4 | 28.1 |
| 38 | 6.5 | 5.5 |

TABLE 5-continued

Carbon Number Profile and Fatty Acid Composition

| 40 | 0.3 | 0.3 |
|---|---|---|
| 42 | 0.9 | 0.8 |
| 44 | 1.6 | 1.6 |

EXAMPLE 2

A stearic/behenic MCT according to the present invention is found to contain a mixture of MMM, MLM, LMM, LLM, LML, and LLL triglycerides. This mixture is fractionated by a molecular distillation process to increase the concentration of mono-long chain triglycerides (MLM and LMM), the long chain fatty acid being predominantly stearic and behenic in this case. A 14" centrifugal molecular still is used for the fractionation, set up as follows:

Bell jar pressure: 0.007 mm Hg. abs.
Degasser pump temperature: 52° C. (126° F.)
Degasser inlet temperature: 100° C. (212° F.)
Rotor feed temperature: 127°-160° C. (261°-320° F.)
Rotor residue temperature: 127°-165° C. (261°-329° F.)
Feed pump rate: 22 lbs./hour
Distillation rate: 1.5 lbs./hr.

The triglyceride mixture is passed through the molecular still eight to fifteen times. The distillation temperature is gradually increased after each pass.

Table 6 below illustrates how the composition of the triglyceride changes during the fractionation, by HPLC carbon number profile and fatty acid composition. After each pass through the molecular still, the distillate is saved and passed again through the molecular still. It is seen that by the fifteenth pass through the molecular still, the product obtained has an increased concentration of $C_{38}$, $C_{40}$ and $C_{42}$ triglycerides. Triglycerides with a carbon number of 32 and below, and 48 and above, have been distilled out from the product. Table 1, discussed above, illustrates some of the possible triglycerides represented by the various carbon numbers. By increasing the concentration of C38, C40 and C42 triglycerides, the fractionation process increases the concentration of the mono-long chain triglycerides (MLM and LMM), and reduces the concentration of the medium chain triglycerides (MMM), di-long chain triglycerides (LLM and LML), and tri-long chain triglycerides (LLL).

A behenic MCT and a stearic MCT are fractionated in a manner similar to that described above. The results are illustrated in Tables 7 and 8.

TABLE 6

Stearic/Behenic MCT

| CNP | D9* | D10 | D12 | D14 | D16 | D18 | D27 |
|---|---|---|---|---|---|---|---|
| 24 | 4.2 | 3.5 | 1.2 | 1.3 | | | |
| 26 | 9.9 | 8.9 | 4.1 | | | | |
| 30 | 4.9 | 4.6 | 2.5 | 2.7 | 1.0 | 0.5 | |
| 32 | 6.5 | 6.4 | 4.9 | 5.4 | 3.2 | 2.0 | |
| 34 | 26.9 | 27.3 | 27.8 | 27.0 | 25.6 | 21.3 | 5.4 |
| 36 | 20.9 | 21.5 | 24.8 | 24.2 | 26.6 | 26.0 | 16.2 |
| 38 | 16.4 | 17.0 | 21.5 | 21.0 | 25.2 | 28.0 | 32.6 |
| 40 | 6.7 | 7.0 | 9.3 | 9.3 | 11.9 | 14.5 | 26.1 |
| 42 | 1.2 | 1.2 | 1.5 | 1.7 | 2.1 | 2.8 | 7.3 |
| 44 | | 0.5 | 0.7 | 0.7 | 1.0 | 1.4 | 4.4 |
| 46 | | | | | 0.4 | 0.6 | 2.4 |
| 48 | | | | | 0.5 | 0.7 | 3.2 |
| 50 | | | | | | | 0.9 |
| 52 | | | | | | | |

TABLE 6-continued

Stearic/Behenic MCT

| | | |
|---|---|---|
| 54 | 0.5 | |

*"D9", "DlO" etc. represent samples of distillate fractions obtained after consecutive passes through the molecular still.

| FAC | D9 | D10 | D12 | D14 | D16 | D18 | D27 |
|---|---|---|---|---|---|---|---|
| C6 | 0.8 | 0.8 | 0.8 | 0.8 | 0.7 | 0.6 | 0.4 |
| C8 | 33.1% | 33.3% | 32.5% | 32.9% | 31.8% | 31.0% | 25.3% |
| C10 | 22.7 | 21.4 | 17.5 | 17.5 | 15.5 | 15.8 | 18.5 |
| C12 | 0.5 | 0.4 | 0.3 | 0.3 | 0.2 | 0 | 0.3 |
| C14 | 0 | 0 | 0 | 0 | 0 | 0 | 0 |
| C16 | 2.7 | 2.6 | 2.5 | 2.5 | 2.0 | 1.7 | 1.1 |
| C18 | 22.6 | 22.3 | 24.6 | 25.0 | 24.1 | 22.9 | 15.9 |
| C18:1 | 0 | 0 | 0 | 0 | 0 | 0 | 0 |
| C18:2 | 0 | 0 | 0 | 0 | 0 | 0 | 0 |
| C18:3 | 0 | 0 | 0 | 0 | 0 | 0 | 0 |
| C20 | 2.9 | 3.0 | 3.6 | 3.6 | 4.0 | 4.3 | 4.5 |
| C22 | 9.7 | 10.3 | 13.0 | 12.9 | 15.7 | 18.5 | 29.6 |
| C24 | 0 | 0.2 | 0.2 | 0.2 | 0.3 | 0.4 | 0.8 |

TABLE 7

Behenic MCT

| CNP | Feed* | D7 | D9 | D11 | D13 | Distillation Residue |
|---|---|---|---|---|---|---|
| 24 | 5.0 | 1.3 | | | | |
| 26 | 7.6 | 6.6 | 2.0 | | | |
| 30 | 2.7 | 5.7 | 2.7 | 0.8 | | |
| 32 | 1.0 | 4.7 | 3.5 | 1.7 | 0.5 | |
| 34 | 1.1 | 4.7 | 5.4 | 2.7 | 1.1 | |
| 36 | 5.2 | 13.5 | 13.7 | 15.0 | 7.4 | |
| 38 | 28.5 | 32.6 | 36.9 | 39.6 | 38.1 | 3.1 |
| 40 | 29.8 | 25.0 | 29.0 | 33.3 | 38.5 | 12.3 |
| 42 | 9.8 | 5.2 | 6.7 | 9.3 | 12.5 | 10.5 |
| 44 | | | | | 0.4 | 1.8 |
| 46 | | | | | 0.6 | 1.6 |
| 48 | | | | | | 2.7 |
| 50 | 0.9 | | | | | 9.4 |
| 52 | 5.9 | | | | | 34.3 |
| 54 | 2.6 | | | | | 20.8 |
| 56+ | | | | | | 4.1 |

*Before fractionation.

| FAC | D7 | D9 | D11 | D13 |
|---|---|---|---|---|
| C6 | 1.3 | 1.2 | 1.0 | 0.8 |
| C8 | 29.1 | 28.9 | 28.1 | 26.5 |
| C10 | 21.7 | 17.3 | 16.7 | 18.8 |
| C12 | 0.6 | 0.4 | 0.3 | 0.3 |
| C14 | 0 | 0 | 0 | 0 |
| C16 | 0.7 | 0.5 | 0.3 | 0.2 |
| C18 | 2.2 | 2.0 | 1.6 | 1.2 |
| C18:1 | 0 | 0 | 0 | 0 |
| C18:2 | 0 | 0 | 0 | 0 |
| C18:3 | 0 | 0 | 0 | 0 |
| C20 | 4.5 | 4.5 | 4.2 | 3.7 |
| C22 | 40.1 | 42.2 | 43.2 | 43.7 |
| C24 | 0.6 | 0.7 | 0.8 | 0.9 |

TABLE 8

Stearic MCT

| CNP | D11 | D12 | D13 | D14 | D15 | D16 |
|---|---|---|---|---|---|---|
| 24 | 3.0 | 1.5 | 1.9 | 1.1 | 0.4 | 0.3 |
| 26 | 7.5 | 5.4 | 5.8 | 4.5 | 2.9 | 2.0 |
| 30 | 3.6 | 2.4 | 3.3 | 2.7 | 1.7 | 1.5 |
| 32 | 11.1 | 10.4 | 11.3 | 10.3 | 9.9 | 8.6 |
| 34 | 38.9 | 41.9 | 37.4 | 40.5 | 42.3 | 40.5 |
| 36 | 28.8 | 32.1 | 29.8 | 31.7 | 34.5 | 34.4 |
| 38 | 4.9 | 4.9 | 6.2 | 5.9 | 6.1 | 7.5 |
| 40 | 0.7 | | 1.2 | 0.9 | 0.4 | 1.4 |
| 42 | 1.8 | | 2.7 | 0.9 | 1.9 | 3.4 |
| 44 | | 1.3 | 0.4 | 2.4 | | |

| FAC | D11 | D14 | D16 |
|---|---|---|---|
| C6 | 1.1 | 1.1 | 1.0 |
| C8 | 32.9 | 33.3 | 32.4 |
| C10 | 18.6 | 17.1 | 16.5 |
| C12 | 0.3 | 0 | 0 |

TABLE 8-continued

Stearic MCT

| C14 | 0 | 0 | 0 |
|---|---|---|---|
| C16 | 4.7 | 4.8 | 4.6 |
| C18 | 35.4 | 38.6 | 40.9 |
| C18:1 | 0 | 0 | 0 |
| C18:2 | 0 | 0 | 0 |
| C18:3 | 0 | 0 | 0 |
| C20 | 0.2 | 0.2 | 0.3 |
| C22 | 0 | 0 | 0 |
| C24 | 0 | 0 | 0 |

EXAMPLE 3

A strawberry-flavored reduced calorie frozen dessert is made by combining the following ingredients:

| Ingredient | % |
|---|---|
| Fresh strawberries, finely sliced | 36.25 |
| Stearic-behenic MCT, Batch 1 | 3 |
| Stearic-behenic MCT, Batch 2 | 8 |
| Stearic-behenic MCT, Batch 3 | 5 |
| Polyglycerol ester emulsifier | 0.5 |
| Hexaglycerol monopalmitate emulsifier | 0.3 |
| Propylene glycol monoester emulsifier made from hydrogenated palm oil | 0.3 |
| Blended gum system (Kelco's Dariloid 100) | 0.15 |
| Fructose | 10 |
| Aspartame | 0.02 |
| Vanilla extract | 0.4 |
| Cream solids | 2 |
| Natural cream flavor | 0.05 |
| Artificial vanilla flavor | 0.05 |
| Dried cream extract | 1.0 |
| Soybean lecithin | 0.25 |
| Skim milk | 32.73 |

The carbon number profiles and fatty acid compositions of the stearic-behenic MCT's are shown above in Table 5. Batch 1 contains 18% medium chain triglycerides (MCT's) by weight, 82% mono-long chain triglycerides (where the long chain is stearic or behenic) and 0% di-long chain triglycerides (stearic and/or behenic), Batch 2 contains 0% MCT's, 99% mono-long chain and 1% di-long chain, and Batch 3 contains 0% MCT's, 94% mono-long chain and 6% di-long chain.

The ingredients are mixed together in a modified batch ice cream making machine equipped with a high shear agitator in the center. The mixture is first warm blended at about 125° F. (52° C.) for about 10 minutes. Then the mixture is cooled to a temperature of about 24° F. (−4° C.) over a time of about 23 minutes, under agitation. As the mixture is cooled, it is simultaneously emulsified and the fat is crystallized. Lastly, the mixture is stored at −60° F. (−51° C.) for two hours and then moved to −20° F. (−29° C.) storage.

The reduced calorie frozen desserts are found to taste much like premium ice cream.

EXAMPLE 4

A chocolate-flavored reduced calorie frozen dessert is made as described in Example 4 by combining the following ingredients:

| Ingredient | % |
|---|---|
| Stearic-behenic MCT, Batch 1 | 3 |
| Stearic-behenic MCT, Batch 2 | 8 |
| Stearic-behenic MCT, Batch 3 | 5 |
| Behenic MCT, Batch 2 | 1 |

| Ingredient | % |
| --- | --- |
| Polyglycerol ester emulsifier | 0.5 |
| Hexaglycerol monopalmitate emulsifier | 0.3 |
| Propylene glycol monoester emulsifier made from hydrogenated palm oil | 0.3 |
| Cocoa | 7 |
| Blended gum system (Kelco's Dariloid 100) | 0.15 |
| Bittersweet Chocolate | 2 |
| Fructose | 5 |
| Sugar (sucrose) | 6 |
| Aspartame | 0.02 |
| Vanilla extract | 0.24 |
| Cream solids | 1 |
| Enzyme modified cream | 1.2 |
| Natural cream flavor | 0.05 |
| Artificial vanilla flavor | 0.05 |
| Dried cream extract | 0.3 |
| Soybean lecithin | 0.25 |
| Skim milk | 58.64 |

The carbon number profiles and fatty acid compositions of the stearic-behenic MCT's and the carbon number profile of the behenic MCT are shown in Table 5. The behenic MCT contains 12% MCT's by weight, 88% mono-behenate, and 0% di-behenate.

EXAMPLE 5

A reduced calorie truffle filling for chocolate-type candy is made as follows. First, the following ingredients are combined and then milled to make a chocolate base material:

| Ingredient | % |
| --- | --- |
| Behenic MCT, Batch 3 | 26 |
| Soybean lecithin | 0.2 |
| Sugar (sucrose) | 35.8 |
| Nonfat milk solids | 10 |
| Spray-dried buttermilk solids | 8 |
| Cocoa powder, natural process, 19–20% fat | 20 |

The carbon number profile of the behenic MCT is shown in Table 5.

The sugar, milk solids, buttermilk solids and cocoa powder are combined in a mixing bowl and then mixed at low speed while slowly adding 60% of the behenic MCT containing all the lecithin. The remaining behenic MCT is then added in the same manner.

These ingredients are then milled in three passes through a four-roll mill to reduce the particle size. The roll pressures are as follows:

|  | Top Roll | 2d Roll | 3d Roll | Bottom Roll |
| --- | --- | --- | --- | --- |
| 1st pass | 250 psig | 200 psig | 0 | 200 psig |
| 2d pass | 250 | 220 | 0 | 220 |
| 3d pass | 270 | 250 | 0 | 240 |

The product after milling comprises the chocolate base material.

This chocolate base material is then blended with additional ingredients to make a truffle filling:

| Ingredient | % |
| --- | --- |
| Behenic MCT, Batch 4 | 9.6 |
| Stearic-behenic MCT, Batch 4 | 2.1 |
| Sugar (sucrose) | 5.5 |
| Vanillin | 0.2 |
| Soybean lecithin | 0.14 |
| Chocolate base material | 82.5 |

The carbon number profile of the behenic MCT and the carbon number profile and fatty acid composition of the stearic-behenic MCT are shown in Table 5.

The filling is prepared by mixing the ingredients at low speed for about 3 minutes, at a temperature of about 120° F. (49° C.). The mixture is then molded and cooled at 50° F. (10° C.) for 30 minutes. The truffle filling is coated with a standard milk chocolate to make a good-tasting reduced calorie chocolate-type candy. Alternatively, the truffle filling can be used as a filling in cakes, pies or truffle desserts.

EXAMPLE 6

A "chocolate" coating for ice cream or other frozen desserts is made from 52 g chocolate liquor, 84 g cocoa (19% fat, natural), 122 g sucrose with very fine particles, 44 g behenic MCT batch 4, 80 g stearic/behenic MCT batch 2, and 0.3 g lecithin (Centracap).

EXAMPLE 7

A reduced calorie chocolate-type confectionery is made from the following ingredients:

| Ingredient | Grams |
| --- | --- |
| Behenic MCT Batch 6 | 226 |
| Soybean Lecithin | 1 |
| Nonfat Milk Solids | 383 |
| Sugar (sucrose) | 1196 |
| Cocoa Powder | 328 |
| Vanilla Flavor | 8 |

The sugar, nonfat milk solids, cocoa powder and vanilla flavor are combined in a mixing bowl with a melted blend of behenic MCT and soybean lecithin. This mixture is then blended thoroughly in a Hobart mixer. The blend is passed through a 4-roll mill having the pressure settings indicated below to reduce the particle size of the sugar:

| Roll | Pressure (psig) |
| --- | --- |
| Top | 220 |
| 2nd | 225 |
| 3rd | 0 |
| bottom | 220 |

An additional 205 g. of the behenic MCT (Batch 6) is added to 2264 g. of this milled mixture. This mixture is again passed through the 4-roll mill using the above roll pressure settings to provide a milled confectionery base.

850 g. of this milled confectionery base is blended with the following additional ingredients at 125° F. (51.7° C.):

| Ingredient | Grams |
| --- | --- |
| Soybean Lecithin | 0.5 |
| Behenic MCT (Batch 6) | 90 |
| Dehydrated Sweet Cream | 8 |
| Butter Flavor | 1.6 |
| Chocolate Liquor | 45 |

The temperature of the above blend is reduced to 87° F. (30.6° C.) and then 100 g. of milled confectionery base that has been aged at room temperature is added. The mixing is continued at approximately 87° F. (30.6° C.) for another 16 hours using a Kitchen Aid mixer set at slow speed. This conched mixture is then poured into chocolate molds and cooled to 56° F. (13.3° C.) for 45 min. The cooled molds are placed in an insulated box and then moved to a 60° F. (15.6° C.) temperature room for 24 hours. Tempering is continued in a 70° F. temperature room for another 48 hours.

EXAMPLE 8

A chocolate-flavored molding composition is formulated from the following ingredients:

| Ingredient | Amount (g.) |
| --- | --- |
| Reduced calorie fat | 1130.7 |
| Chocolate liquor | 152.0 |
| Lecithin | 4.0 |
| Cocoa powder (10–12% fat) | 208.0 |
| Whole milk solids (26% fat) | 388.0 |
| Nonfat milk solids | 140.0 |
| Vanillin | 2.0 |
| Sucrose | 1948.0 |

The reduced calorie fat used in this chocolate-flavored composition is prepared generally as follows: Compritol 888 (a mixture of approximately 25% monobehenin, 50% dibehenin and 25% tribehenin, sold by Gattefosse of 200 Sawmill River Road, Hawthorne, N.Y.) is further esterified at 265° C. with capric fatty acid until the diglyceride concentration of the mixture is reduced to less than 4%. The weight ratio of Compritol 888 to fatty acids at the start of esterification is approximately 70:30. The resulting esterified mixture is deodorized at 260° C. for 3 hours and then combined with Captex 355 (a mixture Of $C_8/C_{10}$ medium chain triglycerides, sold by Capital City Products, of Columbus, Ohio) in a weight ratio of 58:42. This mixture is randomly rearranged (randomized) at a temperature of 80° C. for 20 minutes using 0.06% sodium methoxide as the catalyst, neutralized with phosphoric acid and then filtered to remove sodium phosphate. The randomized mixture (approximately 2.5% diglycerides, 38.5% medium chain (MMM) triglycerides, 43.5% mono-long chain (MLM/MML) triglycerides, 13.5% di-long chain (LLM/LML) triglycerides, and 1% tri-long chain (LLL) triglycerides), is steam stripped at a temperature of 450° to 515° F. during which a major portion of the medium chain triglycerides are distilled off. The stripped residue (2.5% diglycerides, 6% medium chain triglycerides, 67% mono-long chain triglycerides, and 24% di-long chain triglycerides) is then passed three times at gradually increasing temperatures through two 14 inch molecular stills (connected in series) to increase the level of mono-long chain triglycerides. The molecular stills are operated under the following conditions:

Bell jar pressure: 5–11 microns Hg. abs.
Rotor feed temperature: 125°–160° C.
Rotor residue temperature: 180°–216° C.
Initial feed pump rate: 36–40 lbs./hour
Distillation rate: 4–6 lbs./hour per unit The distillate fractions obtained (total of 25) contain 1% medium chain triglycerides, 92% mono-long chain triglycerides, and 5–6% di-long chain triglycerides. Each of these distillate fractions are subjected to nonsolvent fractionation, first at 80° F. and then at 76° F. The liquid (olein) fractions obtained are combined to provide a reduced calorie fat having the following carbon number profile (CNP):

| CNP | % |
| --- | --- |
| 32 | 0.1 |
| 34 | 0.5 |
| 36 | 1.7–2.0 |
| 38 | 21.7–22.9 |
| 40 | 48.0–48.6 |
| 42 | 23.9–24.7 |
| 44 | 0.7–1.0 |
| 46 | 0.2 |
| 48 | 0.2 |
| 50 | 0.2 |
| 52 | 0.1 |

The chocolate-flavored mold composition is processed in two batches of equal size. The cocoa powder, whole milk solids, nonfat milk solids, vanillin and sucrose are blended, and then the melted chocolate liquor is added along with 720.8 g. of the reduced calorie fat. After blending, this mixture is refined twice using a Lehman Four-Roll Refiner (200 psi NIP pressure). This refined mix (3381.4 g.) is dry conched 2½ to 3 hours at 145° F. using a Hobart C-100 Mixer set at speed #2. An additional 257.4 g. of reduced calorie fat is added, and the temperature of the mix is then reduced to 125° F. The mix is then wet-conched at speed #1 for 17 hours.

Finally, the remaining reduced calorie fat (152.5 g.) and lecithin is added to this chocolate-flavored mixture and blended thoroughly for about 45 minutes. The temperature is then reduced to 85° to 90° F. and, after equilibration, the chocolate-flavored mass is weighed into bar molds in 42.6 g. portions. The molds are placed in a 50° F. environment with circulating air. The bars are then tempered under the following conditions:

| Temperature (°F.) | Time (hours) |
| --- | --- |
| 50 | 72 |
| 60 | 24 |
| 70 | 8 |
| 60* | 16 |

*for demolding purposes

The tempered bars are then demolded, individually wrapped in foil and stored at 70° F.

EXAMPLE 9

A chocolate-flavored molding composition is formulated from the following ingredients:

| Ingredient | Amount (g.) |
| --- | --- |
| Reduced calorie fat* | 320.8 |
| Chocolate liquor | 55.1 |
| Lecithin | 0.6 |
| Cocoa powder (10–12% fat) | 61.2 |
| Whole milk solids (26% fat) | 172.8 |
| Vanillin | 0.6 |
| Sucrose | 579.6 |

*Same as Example 8.

The cocoa powder, whole milk solids, vanillin and sucrose is blended, and then 216.1 g. of melted reduced calorie fat is added. This mixture is passed through the Lehman Four-Roll refiner (200 psi NIP pressure) twice. The melted chocolate liquor is added to the refined mix (988.1 g. ) and then dry conched at 140° F. for 3 hours using a C-100 Hobart mixer set at speed #2. The temperature of the mix is then reduced to 120° to 125° F. Lecithin and more reduced calorie fat (50.0 g.) is added, and then the mix was wet-conched for 16 hours at speed #1.

An additional 54.7 g. of reduced calorie fat is then added to the wet-conched mixture. The temperature is then reduced to about 90° F., and the chocolate-flavored mass is molded into 1 oz. bars. The bars is tempered at 50° F. for 16-18 hours, at 60° F. for 24 hours, and then at 70° F. for 24 hours before demolding.

EXAMPLE 10

A chocolate-flavored enrobing composition is formulated from the following ingredients:

| Ingredient | Amount (g.) |
| --- | --- |
| Reduced calorie fat* | 570.4 |
| Chocolate liquor | 76.0 |
| Lecithin | 2.0 |
| Cocoa powder (10–12% fat) | 104.0 |
| Whole milk solids (26% fat) | 194.0 |
| Nonfat milk solids | 70.0 |
| Sucrose | 974.0 |

*Same as Example 8.

The cocoa powder, whole milk solids, nonfat milk solids and sucrose is thoroughly blended, and then the melted chocolate liquor is added along with 360.4 g. of the reduced calorie fat. After thorough blending, the resultant mixture is passed through a Lehman Four-Roll Refiner twice (NIP pressure 200 psi). The refined mix (1732.6 g.) is recovered and then dry-conched 2½ to 3 hours at 145° F. using a Hobart C-100 mixer set at speed #2. After an additional 135.0 g. of the reduced calorie fat is added, the mix temperature is reduced to 125° F., and then wet-conched for about 18 hours at speed #1.

The remaining reduced calorie fat (75.0 g.) and the lecithin are then added to the wet-conched mixture and mixed thoroughly. A portion of this chocolate-flavored coating mixture (~1000 g.) is heated to 120° to 125° F. and mixed at this temperature for about 60 minutes. The temperature is then reduced to about 85° F. Rectangular pieces of confectionary candy centers (caramel, peanuts and nougat) weighing about 8 or 12 g. each are dipped into this chocolate-flavored coating mixture to enrobe the centers. After draining the excess coating, the pieces are placed on trays and cooled to 50° F. After about 65 hours at 50° F., the enrobed candy products are gradually warmed to 60° F. and then held at this temperature for 17 days, followed by gradual warming to 70° F. and then holding at this temperature for 4 hours. The enrobed 8 g. centers are cut into two pieces, while the 12 g. centers were cut into three pieces, and then wrapped individually in foil for storage at 70° F.

EXAMPLE 11

The following illustrate the use of the reduced calorie fats of the present invention in combination with certain nonabsorbable, nondigestible sucrose polyesters:

A. Preparation of Polyol Polyesters and Reduced Calorie Triglycerides

1. Preparation of Liquid Sucrose Polyesters from Soybean Oil

Liquid sucrose polyesters are generally prepared from soybean oil (hydrogenated to Iodine Value 107) which is converted to the respective methyl esters and then reacted with sucrose in the presence of a potassium carbonate catalyst and the potassium soap of the soybean oil fatty acids. The resulting soybean oil polyesters have the fatty acid composition (FAC), ester distribution (Esters) and viscosity (at 100° F., 37.8° C.) shown in the following table:

| FAC | % |
| --- | --- |
| C16:0 | 10.4 |
| C18:0 | 8.3 |
| C18:1 | 45.8 |
| C18:2 | 32.8 |
| C18:3 | 2.1 |
| C20:0 | 0.2 |
| Other | 0.4 |

| Esters | % |
| --- | --- |
| Octa | 90.5 |
| Hepta | 7.7 |
| Other | 1.8 |

| Viscosity | Poise |
| --- | --- |
| 100° F. (37.8° C.) | 1.7 |

2. Preparation of Liquid Sucrose Polyesters from Canola Oil

Liquid sucrose polyesters are prepared from canola oil (hydrogenated to Iodine Value 90) which is converted to the respective methyl esters and then reacted with sucrose in the presence of a potassium carbonate catalyst and the potassium soap of the canola oil fatty acids. The resulting canola polyesters have the fatty acid composition (FAC) and viscosity (at 100° F., 37.8° C.) shown in the following table:

| FAC | % |
| --- | --- |
| C16:0 | 7.0 |
| C16:1 | 0.3 |
| C18:0 | 4.6 |
| C18:1 | 63.0 |
| C18:2 | 21.8 |
| C18:3 | 1.3 |
| C20:0 | 0.4 |
| C20:1 | 1.0 |
| C22:0 | 0.2 |
| C22:1 | 0.1 |
| Other | 0.4 |

| Viscosity | Poise |
| --- | --- |
| 100° F. (37.8° C.) | 1.4 |

3. Preparation of Viscous Sucrose Polyesters from Soybean Hardstock/Soybean Oil

Viscous sucrose polyesters are generally prepared from a 55:45 blend of soybean hardstock (hydrogenated to iodine value 8) and soybean oil (hydrogenated to iodine value 107) which is converted to the respective methyl esters and then reacted with sucrose in the presence of a potassium carbonate catalyst and the potassium soap of the soybean hardstock/soybean oil fatty acids. The resulting soybean hardstock/oil polyesters have the fatty acid composition (FAC), ester distribution (Esters) and viscosity (at 100° F., 37.8° C.) shown in the following table:

| FAC | % |
| --- | --- |
| C16:0 | 9.6 |
| C18:0 | 52.7 |
| C18:1 | 21.3 |
| C18:2 | 14.7 |
| C18:3 | 1.0 |
| C20:0 | 0.5 |

-continued

| | |
|---|---|
| C22:0 | 0.2 |
| Esters | % |
| Octa | 82.1 |
| Hepta | 17.9 |
| Viscosity | Poise |
| 100° F. (37.8° C.) | 42.9 |

4. Preparation of Solid Sucrose Polyesters from Myristic Acid

Solid sucrose polyesters are generally prepared from myristic acid (at least 99% pure) which is converted to the respective methyl esters and then reacted with sucrose in the presence of a potassium carbonate catalyst and the potassium soap of myristic acid. The resulting myristic acid polyesters have the fatty acid composition (FAC) and ester distribution (Esters) shown in the following table:

| FAC | % |
|---|---|
| C12:0 | 0.2 |
| C14:0 | 99.3 |
| C16:0 | 0.1 |
| C18:0 | 0.2 |
| C18:1 | 0.2 |
| Esters | % |
| Octa | 85.9 |
| Hepta | 12.8 |
| Hexa | 1.3 |

5. Preparation of Liquid Sucrose Polyesters from Palm Kernel Oil

Liquid sucrose polyesters are generally prepared from palm kernel oil (hydrogenated to an iodine value of about 4) which is converted to the respective methyl esters and then reacted with sucrose in the presence of a potassium carbonate catalyst and the potassium soap of the palm kernel oil fatty acids. The resulting palm kernel oil polyesters have the fatty acid composition (FAC) and ester distribution (Esters) shown in the following table:

| FAC | % |
|---|---|
| C10:0 | 1.0 |
| C12:0 | 70.4 |
| C14:0 | 18.4 |
| C16:0 | 5.1 |
| C18:0 | 1.0 |
| C18:1 | 3.4 |
| C18:2 | 0.6 |
| Esters | % |
| Octa | 84.6 |
| Hepta | 14.4 |
| Hexa | 1.0 |

6. Preparation of Behenic MCT's

The behenic MCT's (A or B) are generally prepared by random rearrangement (randomization) of tribehenin and medium chain triglycerides using sodium methoxide as the catalyst. The crude mixture resulting from randomization is then subjected to batch distillation (to remove a portion of the medium chain triglycerides), molecular distillation (to remove additional medium chain triglycerides and to separate the mono-long chain triglycerides from the di- and tri-long triglycerides) and nonsolvent fractional crystallization (to remove additional di-long chain triglycerides). The purified behenic MCT's obtained have the fatty acid composition (FAC) and carbon number profile (CNP) shown in the following table:

| FAC | A % | B % |
|---|---|---|
| C6:0 | 0.8 | 0.3 |
| C8:0 | 27.3 | 22.9 |
| C10:0 | 17.8 | 23.4 |
| C12:0 | 0.3 | 0.4 |
| C16:0 | 0.4 | 0.2 |
| C18:0 | 1.8 | 0.6 |
| C18:1 | 0.1 | 0.1 |
| C18:1 | — | 0.1 |
| C20:0 | 4.8 | 2.1 |
| C22:0 | 46.0 | 45.5 |
| C22:1 | 0.2 | 0.2 |
| C24:0 | 1.3 | 1.2 |
| CNP | % | % |
| 26 | 0.1 | |
| 28 | 0.6 | |
| 30 | 0.7 | |
| 32 | 1.3 | |
| 34 | 2.3 | 0.2 |
| 36 | 7.4 | 1.4 |
| 38 | 39.2 | 27.9 |
| 40 | 36.3 | 48.0 |
| 42 | 9.0 | 17.6 |
| 44 | 0.6 | 0.9 |
| 46 | 0.2 | 0.3 |
| 48 | 0.2 | 0.4 |
| 50 | 0.3 | 0.3 |
| 52 | 0.7 | 0.2 |
| 54 | 0.2 | 0.04 |

7. Preparation of Stearic/Behenic MCT's

The stearic/behenic MCT's are generally prepared by randomizing completely hydrogenated high erucic acid rapeseed oil with medium chain triglycerides using sodium methoxide as the catalyst, followed by batch distillation, molecular distillation and fractional crystallization of the crude mixture resulting from randomization. The purified stearic/behenic MCT's obtained have the fatty acid composition (FAC) and carbon number profile (CNP) shown in the following table:

| FAC | % |
|---|---|
| C6:0 | 0.8 |
| C8:0 | 31.0 |
| C10:0 | 14.9 |
| C16:0 | 1.9 |
| C18:0 | 26.2 |
| C18:1 | 0.3 |
| C18:2 | 0.4 |
| C20:0 | 5.8 |
| C22:0 | 26.0 |
| C24:0 | 0.5 |
| CNP | % |
| 26 | 0 |
| 28 | 0.5 |
| 30 | 0.7 |
| 32 | 3.2 |
| 34 | 24.0 |
| 36 | 26.4 |
| 38 | 27.8 |
| 40 | 12.2 |
| 42 | 2.0 |
| 44 | 1.0 |
| 46 | 0.5 |
| 48 | 0.6 |
| 50 | 0.2 |

B. Clear Cooking and Salad Oils

Clear cooking and salad oils are formulated from the above soybean oil polyesters, canola oil polyesters, behenic MCT's stearic/behenic MCT's and soybean oil as follows:

| Component | % |
|---|---|
| CLEAR COOKING AND SALAD OIL I* | |
| Soybean or canola oil polyesters | 7 |
| Behenic MCT's | 12 |
| Soybean oil | 81 |
| CLEAR COOKING AND SALAD OIL II** | |
| Soybean or canola oil polyesters | 12 |
| Stearic/behenic MCT'S | 20 |
| Soybean oil | 68 |

*at 70° F. (21.1° C.)
**at 50° F. (10° C.)

C. Frying Oils and Potato Chips

Frying oils for potato chips are formulated from the above soybean oil polyesters, soybean hardstock/oil polyesters, behenic MCTs and stearic/behenic MCTs as follows:

| Component | % |
|---|---|
| FRYING OIL I | |
| Soybean hardstock/oil polyesters | 22 |
| Soybean oil polyesters | 28 |
| Stearic/behenic MCTs | 43 |
| Behenic MCTs (A) | 7 |
| FRYING OIL II | |
| Soybean oil polyesters | 50 |
| Behenic MCTs (A) | 50 |

Ninety grams of sliced potatoes are fried in 11 kg. of frying oil I or frying oil II at a temperature of 365° F. (185° C.) for 3 minutes, 5 seconds, to provide potato chips.

D. Chocolate-Flavored Candy Bar

A blend containing the myristic acid polyesters is prepared from the following ingredients

| Ingredient | Grams |
|---|---|
| Chocolate liquor | 3.6 |
| Cocoa powder (11% cocoa butter) | 5.1 |
| Sweet cream powder (72% milkfat) | 2.4 |
| Lecithin | 0.1 |
| Natural/artificial butter flavors | 0.14 |
| Sucrose powder (extra fine) | 15.7 |
| Myristic acid polyester | 14.0 |

The above blend is heated to 135° F. (57.2° C.) in a glass beaker and then gradually cooled to 90° F. (32.2° C.) with mixing until the blend becomes smooth and lump-free.

A blend containing the behenic MCT's is prepared from the following ingredients:

| Ingredient | Grams |
|---|---|
| Behenic MCT's (B) | 14.0 |
| Soybean lecithin | 0.12 |
| Cocoa powder (11% cocoa butter) | 7.7 |
| Nonfat milk solids | 9.0 |
| Vanilla flavor | 0.18 |
| Sucrose | 28.0 |

The above blend is passed twice through a 4-roll mill to reduce the particle size of the sucrose. The roll milled behenic MCT-containing blend is then combined with the myristic acid polyester-containing blend, poured at 90° F. (32.2° C.) into chocolate bar molds, cooled at 50° F. (10° C.) for 48 hours and then gradually warmed to 70° F. (21.1° C.) in a styrofoam cooler. The tempered chocolate-flavored candy bars are then demolded.

E. Margarine-Like Spread

The aqueous phase of the margarine-like spread is formulated from the following ingredients:

| Ingredient | Grams |
|---|---|
| Water | 150 |
| Distilled mono- and diglycerides | 1.5 |
| Lecithin | 1.0 |
| Natural/artificial butter flavors | 0.09 |
| Salt | 11.0 |
| Potassium Sorbate | 0.12 |
| Citric acid | 0.04 |

The above aqueous phase ingredients are dissolved in the water and then heated to 130° F. (54.4° C.).

The fat phase of the margarine-like spread is formulated from the following ingredients:

| Ingredient | Grams |
|---|---|
| Stearic/behenic MCT's | 332.5 |
| Palm kernel oil polyesters | 166.2 |
| Soybean hardstock/oil polyesters | 166.0 |
| Soybean oil polyesters | 166.0 |

The aqueous phase ingredients are blended into the fat phase ingredients at 130° F. (54.4° C.) under high shear mixing conditions using an Agi mixer equipped with a homogenizer head, a rotating bowl and Teflon scrapper blades to remove emulsified and crystallized material from the inside wall of the bowl. Chilled water is sprayed on the outside wall of the bowl to cool it. As the mass in the bowl is cooled to approximately 67° F. (19.4° C.), the viscosity increases to that of a typical soft margarine consistency. The emulsified/crystallized material is filled into plastic tubs, placed in a 32° F. (0° C.) bath for 1 hour and then stored for 48 hours in a 40° F. (4.4° C.) constant temperature room to provide a soft, spreadable margarine-like product.

F. Frozen Strawberry-Flavored Dessert

A frozen strawberry-flavored dessert is formulated from the following ingredients:

| Ingredient | Grams |
|---|---|
| Frozen strawberries (thawed and homogenized) | 700 |
| Palm kernel oil polyesters | 128 |
| Stearic/behenic MCT's | 192 |
| Polyglycerol ester emulsifier | 18 |
| Propylene glycol monostearate | 8 |
| Dariloid (gum mixture) | 4 |
| Sucrose | 320 |
| Vanilla extract | 4 |
| Dried cream extract | 10 |
| Skim milk | 569 |
| Artificial cream flavors | 2 |

Except for the strawberries, the above ingredients are homogenized at 120°–135° F. (48.9°–57.2° C.) for about 10 minutes under high shear mixing using the same equipment as in the margarine-like spread example, but with chilled propylene glycol as the coolant. This homogenized mixture is cooled to 63° F. (17.2° C.) and then a portion (approximately 500 g.) of the strawberries are added. This homogenized mixture is cooled further to 40° F. (4.4° C.) and then the remaining portion of the strawberries are added. After further cooling, this mixture starts to freeze at 30° F. (−1.1° C.). After freezing begins, this mixture is cooled for about 10 additional minutes before being transferred into one-pint containers. This entire cooling/freezing process takes place in about 2 hours. The pint containers are stored for 2 to 3 hours at approximately −40° F. (−40° C.) to provide the final ice cream-like frozen strawberry-flavored dessert.

G. Analytical Methods for Polyol Polyesters

1. Fatty Acid Composition

The fatty acid composition (FAC) of the polyol polyesters is determined by gas chromatography, using a Hewlett-Packard Model S712A gas chromatograph equipped with a thermal conductivity detector and a Hewlett-Packard Model 7671A automatic sampler. The chromatographic method used is described in *Official Methods and Recommended Practices of the American Oil Chemists Society*, 3rd Ed., 1984, Procedure Ce 1-62.

2. Ester Distribution of Polyol Polyesters

The relative distribution of the individual octa-, hepta-, hexa- and penta- esters, as well as collectively the tetra- through mono- esters, of the polyol polyesters can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e., an evaporative light scattering detector). The detector response is measured and then normalized to 100%. The individual ester groups are expressed as a relative percentage.

3. Viscosity Measurements a. Sample Preparation

The polyol polyester is melted at about 160° F. (71.1° C.). A 3 gram sample of melted polyol polyester is weighed into a glass vial. The vial and its contents are heated to 160° F. (71.1° C.) and then immediately transferred to a controlled temperature room held at 100° F. (37.8° C.). The sample is then allowed to recrystallize at 100° F. (37.8° C.) for 24 hours. After the 24 hour time period has elapsed, the sample is taken to the viscometer in an insulated cup and the viscosity is measured.

b. Ferranti-Shirley Viscometer Operation Procedure

A Ferranti-Shirley viscometer is used for the viscosity measurement. A cone is put into place, and the viscometer temperature is adjusted to 100° F. (37.8° C.). The chart recorder is calibrated, and the gap between the cone and plate is set. The cone speed is checked, and the cone and plate temperatures are equilibrated to 100° F. (37.8° C.). The panel controls are set. Sufficient sample is placed between the plate and the cone so that the gap is completely filled. The temperature is allowed to stabilize at 100° F. (37.8° C.) for about 30 seconds. The test is started by selecting the rpm for 10 seconds$^{-1}$ shear rate and record on the strip chart recorder. The shear stress is recorded at 10 minutes after the point when the maximum shear stress is reached. Viscosity (poise) = shear stress (dynes/cm$^2$) divided by shear rate (second$^{-1}$).

What is claimed is:

1. A reduced calorie fat having an at least about 10% reduction in calories relative to corn oil and comprising at least about 50% by weight reduced calorie triglycerides selected from the group consisting of MML, MLM, LLM, and LML triglycerides, and mixtures thereof and at least about 10% by weight of a mixture of MML and MLM triglycerides; wherein M = fatty acids selected from the group consisting of $C_6$ to $C_{10}$ saturated fatty acids, and mixtures thereof, and L = fatty acids selected from the group consisting of $C_{17}$ to $C_{26}$ saturated fatty acids, and mixtures thereof; and wherein the fat has the following fatty acid composition by weight percent:

(a) from about 15 to about 70% $C_6$ to $C_{10}$ saturated fatty acids;

(b) from about 10 to about 70% $C_{17}$ to $C_{26}$ saturated fatty acids;

(c) not more than about 10% fatty acids selected from the group consisting of $C_{12:0}$ and $C_{14:0}$, and mixtures thereof;

(d) not more than about 20% fatty acids selected from the group consisting of $C_{18:1}$, $C_{18:2}$, $C_{18:3}$, and mixtures thereof; and (e) not more than 4% $C_{18:2}$ fatty acids.

2. The reduced calorie fat of claim 1 which comprises at least about 35% by weight of said mixture of MML and MLM triglycerides and no more than about 65% by weight combined LLM and LML triglycerides.

3. The reduced calorie fat of claim 2 wherein the fatty acid composition comprises not more than about 5% $C_{6:0}$ fatty acid.

4. The reduced calorie fat of claim 3 wherein the fatty acid composition comprises not more than about 7% saturated $C_{24}$ to $C_{26}$ fatty acids.

5. The reduced calorie fat of claim 4 wherein the fatty acid composition comprises not more than about 10% $C_{16:0}$ fatty acid.

6. The reduced calorie fat of claim 5 wherein the fatty acid composition comprises not more than about 3% fatty acids selected from the group consisting of $C_{12:0}$ and $C_{14:0}$ fatty acids, and mixtures thereof.

7. The reduced calorie fat of claim 6 wherein the fatty acid composition comprises not more than about 6% fatty acids selected from the group consisting of $C_{18:1}$, $C_{18:2}$, and $C_{18:3}$ fatty acids, and mixtures thereof.

8. The reduced calorie fat of claim 7 wherein said reduced calorie triglycerides are stearic MCT's having a carbon number profile of at least about 55% C34 to C38, and have a fatty acid composition comprising at least about 40% $C_8$ to $C_{10}$ saturated fatty acids and from about 35 to about 50% $C_{18:0}$ fatty acid.

9. A fat-containing food composition having fat ingredients and nonfat ingredients wherein from about 50 to 100% of the total fat by weight comprises a reduced calorie fat, said reduced calorie fat having an at least about 10% reduction in calories relative to corn oil and comprising at least about 50% by weight reduced calorie triglycerides selected from the group consisting of MML, MLM, LLM, and LML triglycerides, and mixtures thereof; wherein M = fatty acids selected from the group consisting of $C_6$ to $C_{10}$ saturated fatty acids, and mixtures thereof, and L = fatty acids selected from the group consisting of $C_{17}$ to $C_{26}$ saturated fatty acids, and mixtures thereof; and wherein the fat has the following fatty acid composition by weight percent:

(a) from about 15 to about 70% $C_6$ to $C_{10}$ saturated fatty acids;

(b) from about 10 to about 70% $C_{17}$ to $C_{26}$ saturated fatty acids;

(c) not more than about 10% fatty acids selected from the group consisting of $C_{12:0}$ and $C_{14:0}$, and mixtures thereof;

(d) not more than about 20% fatty acids selected from the group consisting of $C_{18:1}$, $C_{18:2}$, $C_{18:3}$, and mixtures thereof; and (e) not more than 4% $C_{18:2}$ fatty acids.

10. The composition of claim 9 wherein said reduced calorie fat comprises at least about 35% by weight of said mixture of MML and MLM triglycerides and no more than about 65% by weight combined LLM and LML triglycerides.

11. The composition of claim 10 wherein said reduced calorie fat has a fatty acid composition which comprises not more than about 5% $C_{6:0}$ fatty acid.

12. The composition of claim 11 wherein said reduced calorie fat has a fatty acid composition which comprises not more than about 7% saturated $C_{24}$ to $C_{26}$ fatty acids.

13. The composition of claim 12 which is a food selected from a margarine, a shortening, a baked good, a frozen dessert, a confectionery and a chocolate-type product.

14. A reduced calorie fat having an at least about 30% reduction in calories relative to corn oil, said fat comprising at least about 50% by weight combined MML, MLM, LLM, and LML triglycerides, at least about 35% by weight of a mixture of MML and MLM triglycerides, and no more than about 65% by weight combined LLM and LML triglycerides, no more than about 15% by weight MMM triglycerides, and no more than about 5% by weight LLL triglycerides; wherein M=fatty acids selected from the group consisting of $C_8$ to $C_{10}$ saturated fatty acids, and mixtures thereof, and L=fatty acids selected from the group consisting of $C_{18}$ to $C_{22}$ saturated fatty acids, and mixtures thereof; and wherein said fat has the following fatty acid composition by weight percent:

(a) from about 30 to about 55% $C_8$ to $C_{10}$ saturated fatty acids;

(b) from about 30 to about 55% $C_{18}$ to $C_{22}$ saturated fatty acids;

(c) not more than about 10% $C_{16:0}$ fatty acid;

(d) not more than about 1% fatty acids selected from the group consisting of $C_{12:0}$ and $C_{14:0}$, and mixtures thereof; and (d) not more than about 1% fatty acids selected from the group consisting of $C_{18:1}$, $C_{18:2}$, $C_{18:3}$, and mixtures thereof.

15. The reduced calorie fat of claim 14 which comprises at least about 70% by weight of said mixture of MML and MLM triglycerides, no more than about 30% by weight combined LLM and LML triglycerides, no more than about 5% by weight MMM triglycerides and no more than about 2% by weight LLL triglycerides.

16. The reduced calorie fat of claim 15 having between about 20% and 50% reduction in calories relative to corn oil.

17. A fat-containing food composition having fat and nonfat ingredients wherein from about 50 to 100% of the total fat comprises the reduced calorie fat of claim 16.

18. The reduced calorie fat of claim 15 which comprises at least about 85% by weight of said mixture of MML and MLM triglycerides, no more than about 5% by weight combined LLM and LML triglycerides, no more than about 4% MMM triglycerides and no more than about 1% by weight LLL triglycerides.

19. The reduced calorie fat of claim 18 which has the following carbon number profile (CNP):

| CNP | (%) |
| --- | --- |
| 32 or lower | <3 |
| 34 | <2 |
| 36 | <4 |
| 38 | 15–40 |
| 40 | 35–60 |
| 42 | 15–35 |
| 44 | <2 |
| 46 | <1 |
| 48 | <0.6 |
| 50 | <0.6 |
| 52 | <0.4 |
| 54 or higher | <0.9. |

20. A confectionery which contains the fat of claim 19.

21. A chocolate-type product which contains the fat of claim 19.

* * * * *